(12) United States Patent
Xiao et al.

(10) Patent No.: US 10,524,135 B2
(45) Date of Patent: Dec. 31, 2019

(54) WIRELESS NETWORK COVERAGE ENHANCEMENT METHOD, APPARATUS, AND SYSTEM

(71) Applicant: HUAWEI TECHNOLOGIES CO., LTD., Shenzhen, Guangdong (CN)

(72) Inventors: Jiehua Xiao, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/587,475

(22) Filed: May 5, 2017

(65) Prior Publication Data
US 2017/0245158 A1 Aug. 24, 2017

Related U.S. Application Data

(63) Continuation of application No. PCT/CN2014/090619, filed on Nov. 7, 2014.

(51) Int. Cl.
*H04W 16/20* (2009.01)
*H04W 28/04* (2009.01)
(Continued)

(52) U.S. Cl.
CPC .......... *H04W 16/20* (2013.01); *H04B 17/318* (2015.01); *H04L 1/0003* (2013.01);
(Continued)

(58) Field of Classification Search
CPC ..................................................... H04W 16/20
See application file for complete search history.

(56) References Cited

U.S. PATENT DOCUMENTS

2007/0297324 A1* 12/2007 Lindoff ............... H04J 11/0093
370/210
2010/0296388 A1* 11/2010 Shimizu ............... H04L 1/0002
370/216
(Continued)

FOREIGN PATENT DOCUMENTS

CN 101110635 A 1/2008
CN 101754267 A 6/2010
(Continued)

OTHER PUBLICATIONS

International Search Report dated Jul. 31, 2015, in corresponding International Application No. PCT/CN2014/090619.
(Continued)

*Primary Examiner* — Ayodeji O Ayotunde
(74) *Attorney, Agent, or Firm* — Leydig, Voit & Mayer, Ltd.

(57) ABSTRACT

The present disclosure provides a wireless network coverage enhancement method, apparatus, and system. The method includes: receiving, by a terminal, a downlink signal sent by a network device; determining, by the terminal, a first coverage level of the terminal according to the downlink signal; determining, by the terminal, an uplink communications parameter according to the first coverage level; and sending, by the terminal, an uplink signal to the network device according to the uplink communications parameter. According to the method in embodiments of the present invention, a probability of successfully receiving the uplink signal is improved. Therefore, the network device does not need to send a NACK to the terminal, so that overheads of an air interface between the terminal and the network device are reduced, a period in which the terminal performs coverage enhancement is shortened, and power consumption of the terminal is reduced.

16 Claims, 6 Drawing Sheets

(51) Int. Cl.
| | |
|---|---|
| *H04B 17/318* | (2015.01) |
| *H04W 24/02* | (2009.01) |
| *H04W 52/02* | (2009.01) |
| *H04W 74/00* | (2009.01) |
| *H04L 1/00* | (2006.01) |
| *H04L 1/08* | (2006.01) |
| *H04H 20/16* | (2008.01) |

(52) U.S. Cl.
CPC .............. *H04L 1/0009* (2013.01); *H04L 1/08* (2013.01); *H04W 24/02* (2013.01); *H04W 28/04* (2013.01); *H04W 52/0225* (2013.01); *H04W 74/006* (2013.01); *H04H 20/16* (2013.01); *H04L 1/0021* (2013.01); *Y02D 70/00* (2018.01); *Y02D 70/1242* (2018.01); *Y02D 70/1262* (2018.01); *Y02D 70/21* (2018.01)

(56) References Cited

U.S. PATENT DOCUMENTS

| | | | |
|---|---|---|---|
| 2011/0021157 A1 | 1/2011 | Sahara | |
| 2011/0098076 A1* | 4/2011 | Kim | H04W 52/12 455/522 |
| 2011/0205983 A1* | 8/2011 | Bharadwaj | H04L 1/0025 370/329 |
| 2014/0056272 A1 | 2/2014 | Gao et al. | |
| 2016/0127918 A1* | 5/2016 | Yi | H04W 84/047 370/329 |
| 2016/0128037 A1 | 5/2016 | Park et al. | |
| 2016/0142981 A1* | 5/2016 | Yi | H04J 11/0069 455/522 |
| 2016/0353440 A1 | 12/2016 | Lee et al. | |

FOREIGN PATENT DOCUMENTS

| | | |
|---|---|---|
| CN | 102695261 A | 9/2012 |
| CN | 105453461 A | 3/2016 |
| JP | 2014512770 A | 5/2014 |
| JP | 2017513260 A | 5/2017 |
| WO | 2014046458 A1 | 3/2014 |
| WO | 2014055878 A1 | 4/2014 |
| WO | 2015/012654 A1 | 1/2015 |
| WO | 2015/116732 A1 | 8/2015 |

OTHER PUBLICATIONS

Extended European Search Report dated Oct. 6, 2017 in corresponding European Patent Application No. 14905594.9.
LG Electronics: "PDSCH/PUSCH/(E)PDCCH and DMRS Enhancements for Coverage-limiting UEs," 3GPP Draft; R1-131297 MTC PDCCH PDSCH RS (Final), $3^{rd}$ Generation Partnership Project (3GPP), Mobile Competence Centre; 650 Route Des Lucioles; F-06921 Sophia Antipolis Cedex; France, vol. RAN WG1, No. Chicago, USA, Apr. 6, 2013, XP050697174.
International Search Report dated Jul. 31, 2015, in International Application No. PCT/CN2014/090619 (4 pgs).
Huawei, HiSilicon,"Measurements and reporting for configuring coverage enhancements," 3GPP TSG RAN WG1 Meeting #78b, Agenda Item: 7.3.1.1.2, Ljubljana, Slovenia, Oct. 6-10, 2014, R1-144329, 6 pgs.
Huawei, HiSilicon,"Determining the repetition level during initial random access and non-initial random access," 3GPP TSG RAN WG1 Meeting #75, Agenda Item: 6.2.2.2.2, San Francisco, USA, Nov. 11-15, 2013, R1-135382, 4 pgs.
Sharp, "Discussion on PRACH coverage enhancement for MTC UE," 3GPP TSG RAN WG1 Meeting #75, Agenda Item: 6.2.2.2.2, San Francisco, USA, Nov. 11-15, 2013, R1-135342, 4 pgs.
Alcatel-Lucent, Alcatel-Lucent Shanghai Bell, "Configurable repetition level for PBCH", 3GPP TSG-RAN WG1 Meeting #73, Agenda Item: 6.2.4, Fukuoka, Japan, May 20-24, 2013, R1-132055, 3 pgs.
Huawei, HiSilicon, "Coverage analysis and evaluation on PSS/SSS for low-cost MTC UEs," 3GPP TSG RAN WG1 Meeting #72bis, Agenda Item: 7.2.4.1, Chicago, USA, Apr. 15-19, 2013, R1-130885, 2 pgs.
Alcatel-Lucent, Alcatel-Lucent Shanghai Bell, "Coverage enhancement for PSS/SSS, PBCH, PRACH and PMCH," 3GPP TSG RAN WG1 Meeting #78bis, Agenda Item: 7.3.1.2.3, Ljubljana, Slovenia, Oct. 6-10, 2014, R1-144078, 7 pgs.
Intel Corporation, "Coverage Improvement for PRACH," 3GPP TSG RAN WG1 Meeting #76, Agenda Item: 7.2.2.2.2, Prague, Czech Republic, Feb. 10-14, 2014, R1-140115, 9 pgs.
Japanese Office Action dated Jul. 9, 2018, in corresponding Japanese Patent Application No. 2017-542232, 15 pgs.
Notice of Reasons for Rejection dated Nov. 21, 2018 in Japanese Application No. 2017-54223 with English translation (17pp).
MediaTek Inc.,"Discussion on PRACH and RACH procedure in coverage enhancement mode",3GPP TSG-RAN WG1 #75 R1-135424,San Francisco, USA, Nov. 11-15, 2013, total 5 pages.
Japanese Office Action dated Feb. 26, 2019 in Japanese Application No. 2017-542232 (4 pages).
Haitao Zhang: "Edge Coverage Electrical Level Analysis of TD-LTE RSRP",Odern Science and Technology of Telecommunications, Jul. 2012. total 4 pages. with English abstract.
Chinese Office Action dated Sep. 6, 2018 in Chinese Patent Application No. 201480032414.0, total 7 pages.
"Discussion on PRACH and RACH procedure in coverage enhancement mode," 3GPP TSG-RAN WG1 #75, R1-135424, San Francisco, USA, pp. 1-5, 3rd Generation Partnership Project—Valbonne, France (Nov. 11-15, 2013).

\* cited by examiner

WIRELESS NETWORK COVERAGE ENHANCEMENT METHOD, APPARATUS, AND SYSTEM

CROSS-REFERENCE TO RELATED APPLICATIONS

This application is a continuation of International Application No. PCT/CN2014/090619, filed on Nov. 7, 2014, the disclosure of which is hereby incorporated by reference in its entirety.

TECHNICAL FIELD

The present disclosure relates to the communications technologies, and in particular, to a wireless network coverage enhancement method, apparatus, and system.

BACKGROUND

An existing wireless communications network, such as a Global System for Mobile Communications (GSM), a Universal Mobile Telecommunications System (UMTS), or a Long Term Evolution (LTE) system is mainly specific to human-to-human (H2H) communication, and mainly considers a wireless environment such as an outdoor scenario or a common indoor scenario. Currently, the 3rd Generation Partnership Project (3GPP) standard has already started to consider using a wireless network to support machine-to-machine (M2M) communication, that is, machine type communication (MTC). Because some terminal devices applied to M2M communication are located in uninhabited areas such as a basement, a tunnel, a valley, and a forest, signal coverage in these places is relatively poor. In order that the terminal devices located in these areas can properly communicate with a network device, coverage performance, of a wireless network, for the terminal devices located in these areas needs to be enhanced.

In the prior art, a hybrid automatic repeat request (HARQ) mechanism or an automatic repeat request (ARQ) mechanism may be used for a wireless network with short-duration coverage or relatively poor coverage performance. Specifically, when data is transmitted for the first time, if a receiving end (for example, a base station) does not correctly receive the data, the receiving end notifies, by using a negative acknowledgement (NACK), a sending end (for example, a terminal) of a message that the data is not correctly received, and the sending end resends (data retransmission) the data that is not correctly received. The receiving end performs soft combination on the retransmitted data and the previously sent data to improve a probability of correctly receiving the data, so as to enhance coverage performance of the network to some extent.

However, in the prior art, an automatic retransmission mechanism used for coverage enhancement is a transmission mechanism based on a Media Access Control (MAC) layer and/or a transmission mechanism based on a Radio Link Control (RLC) layer. The sending end needs an acknowledgement (ACK)/NACK feedback response mechanism of the receiving end to cooperate in performing the automatic retransmission mechanism. For places with relatively weak signal coverage, the receiving end needs to reply with NACK messages for multiple times to trigger multiple retransmissions performed by the sending end, to improve a probability of successful receiving performed by the receiving end. Consequently, air-interface interaction is frequent, and signaling overheads are large. In addition, the sending end cannot effectively adjust coverage enhancement in a timely manner according to a change of a coverage environment in which the sending end is located, and execution efficiency of coverage enhancement is low.

SUMMARY

Embodiments of the present invention provide a wireless network coverage enhancement method, apparatus, and system, so as to resolve a prior-art technical problem that execution efficiency of coverage enhancement is low and air interface signaling overheads are large.

According to a first aspect, an embodiment of the present invention provides a terminal, including:

a receiving unit, configured to receive a downlink signal sent by a network device;

a processing unit, configured to determine a first coverage level of the terminal according to the downlink signal, and determine an uplink communications parameter according to the first coverage level; and a sending unit, configured to send an uplink signal to the network device according to the uplink communications parameter.

With reference to the first aspect, in a first possible implementation manner of the first aspect, the uplink communications parameter includes at least one of the following: a quantity of repetition times, channel bandwidth, transmit power, or a modulation and coding scheme that is used for sending the uplink signal by the terminal.

With reference to the first aspect or the first possible implementation manner of the first aspect, in a second possible implementation manner of the first aspect, the downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

With reference to the second possible implementation manner of the first aspect, in a third possible implementation manner of the first aspect, when the downlink signal is any one of the first signal, the second signal, or the third signal, the processing unit is specifically configured to: when the downlink signal is successfully decoded, determine the first coverage level of the terminal according to a first preset relationship and a quantity of times of receiving the downlink signal by the receiving unit, where the first preset relationship includes a mapping relationship between the first coverage level and the quantity of times of receiving the downlink signal when the terminal successfully decodes the downlink signal.

With reference to the second possible implementation manner of the first aspect, in a fourth possible implementation manner of the first aspect, when the downlink signal is the repeatedly-sent sequence signal used for downlink synchronization, the processing unit is specifically configured to: perform, at a moment of receiving the downlink signal, energy accumulation on all downlink signals received by the receiving unit; correlate a signal obtained after energy accumulation and a preset reference signal of the downlink signal, to obtain a correlation value of the downlink signal; and when the correlation value of the downlink signal exceeds a preset threshold, determine the first coverage level of the terminal according to a second preset relationship and a quantity of times of receiving the downlink signal by the receiving unit, where the second preset relationship includes a mapping relationship between the first coverage level and the quantity of times of receiving the downlink signal by the terminal when the correlation value of the downlink signal exceeds the preset threshold.

With reference to the second possible implementation manner of the first aspect, in a fifth possible implementation manner of the first aspect, when the downlink signal is the signal transmitted on the BCCH carrier, the processing unit is specifically configured to: measure received signal strength of the downlink signal received by the receiving unit in a preset period of time, determine first received signal strength according to the received signal strength that is of the downlink signal and is measured in the preset period of time, and determine the first coverage level of the terminal according to the first received signal strength and a third preset relationship, where the third preset relationship includes a mapping relationship between the first received signal strength and the first coverage level.

With reference to the second possible implementation manner of the first aspect, in a sixth possible implementation manner of the first aspect, when the downlink signal is the reference signal used for cell channel measurement, the processing unit is specifically configured to: measure a path loss between the terminal and the network device according to the downlink signal received by the receiving unit in a preset period of time, determine a first path loss between the terminal and the network device according to all path losses measured in the preset period of time, and determine the first coverage level of the terminal according to the first path loss and a fourth preset relationship, where the fourth preset relationship includes a mapping relationship between the first path loss and the first coverage level.

With reference to any one of the first aspect to the sixth possible implementation manner of the first aspect, in a seventh possible implementation manner of the first aspect, the sending unit is further configured to send the first coverage level to the network device.

With reference to the seventh possible implementation manner of the first aspect, in an eighth possible implementation manner of the first aspect, the processing unit is further configured to establish a service connection to the network device;

the receiving unit is further configured to receive a service signal repeatedly sent by the network device, where a quantity of repetition times of the service signal is determined by the network device according to the first coverage level of the terminal; and the processing unit is further configured to determine a second coverage level of the terminal according to a fifth preset relationship and the quantity of times of receiving the service signal when the service signal is successfully decoded, where the fifth preset relationship includes a mapping relationship between the second coverage level and the quantity of times of receiving the service signal when the terminal successfully decodes the service signal.

According to a second aspect, an embodiment of the present invention provides a network device, including:

a sending unit, configured to send a downlink signal to a terminal; and a receiving unit, configured to receive an uplink signal that is sent by the terminal according to an uplink communications parameter determined by the terminal, where the uplink communications parameter is determined by the terminal according to a first coverage level, and the first coverage level is determined by the terminal according to the downlink signal.

With reference to the second aspect, in a first possible implementation manner of the second aspect, the uplink communications parameter includes at least one of the following: a quantity of repetition times, channel bandwidth, transmit power, or a modulation and coding scheme that is used for sending the uplink signal by the terminal.

With reference to the second aspect or the first possible implementation manner of the second aspect, in a second possible implementation manner of the second aspect, the downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

With reference to any one of the second aspect to the second possible implementation manner of the second aspect, in a third possible implementation manner of the second aspect, the receiving unit is further configured to: after the sending unit sends the downlink signal to the terminal, receive the first coverage level sent by the terminal.

With reference to the third possible implementation manner of the second aspect, in a fourth possible implementation manner of the second aspect, the network device further includes a processing unit, where the processing unit is configured to establish a service connection to the terminal after the receiving unit receives the first coverage level sent by the terminal; and the sending unit is further configured to repeatedly send a service signal to the terminal according to the first coverage level, so that the terminal determines a second coverage level of the terminal according to the repeatedly-sent service signal; or the processing unit is configured to perform resource scheduling on the terminal according to the first coverage level after the receiving unit receives the first coverage level sent by the terminal.

With reference to the second possible implementation manner of the second aspect, in a fifth possible implementation manner of the second aspect, when the uplink communications parameter includes the quantity of repetition times, the channel bandwidth, or the modulation and coding scheme that is used for sending the uplink signal by the terminal, the receiving unit is further configured to receive the uplink communications parameter sent by the terminal, and the processing unit is further configured to decode the uplink signal according to the uplink communications parameter.

According to a third aspect, the present invention provides a wireless network coverage enhancement method, including:

receiving, by a terminal, a downlink signal sent by a network device;

determining, by the terminal, a first coverage level of the terminal according to the downlink signal;

determining, by the terminal, an uplink communications parameter according to the first coverage level; and sending, by the terminal, an uplink signal to the network device according to the uplink communications parameter.

With reference to the third aspect, in a first possible implementation manner of the third aspect, the uplink communications parameter includes at least one of the following: a quantity of repetition times, channel bandwidth, transmit power, or a modulation and coding scheme that is used for sending the uplink signal by the terminal.

With reference to the third aspect or the first possible implementation manner of the third aspect, in a second possible implementation manner of the third aspect, the downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

With reference to the second possible implementation manner of the third aspect, in a third possible implementation manner of the third aspect, when the downlink signal is any one of the first signal, the second signal, or the third signal, the determining, by the terminal, a first coverage level of the terminal according to the downlink signal includes:

when the downlink signal is successfully decoded, determining, by the terminal, the first coverage level of the terminal according to a first preset relationship and a quantity of times of receiving the downlink signal, where the first preset relationship includes a mapping relationship between the first coverage level and the quantity of times of receiving the downlink signal when the terminal successfully decodes the downlink signal.

With reference to the second possible implementation manner of the third aspect, in a fourth possible implementation manner of the third aspect, when the downlink signal is the repeatedly-sent sequence signal used for downlink synchronization, the determining, by the terminal, a first coverage level of the terminal according to the downlink signal includes:

performing, by the terminal at a moment of receiving the downlink signal, energy accumulation on all the received downlink signals;

correlating, by the terminal, a signal obtained after energy accumulation and a preset reference signal of the downlink signal, to obtain a correlation value of the downlink signal; and when the correlation value of the downlink signal exceeds a preset threshold, determining, by the terminal, the first coverage level of the terminal according to a second preset relationship and a quantity of times of receiving the downlink signal, where the second preset relationship includes a mapping relationship between the first coverage level and the quantity of times of receiving the downlink signal by the terminal when the correlation value of the downlink signal exceeds the preset threshold.

With reference to the second possible implementation manner of the third aspect, in a fifth possible implementation manner of the third aspect, when the downlink signal is the signal transmitted on the BCCH carrier, the determining, by the terminal, a first coverage level of the terminal according to the downlink signal includes:

measuring, by the terminal, received signal strength of the downlink signal received in a preset period of time;

determining, by the terminal, first received signal strength according to the received signal strength that is of the downlink signal and is measured in the preset period of time; and determining, by the terminal, the first coverage level of the terminal according to the first received signal strength and a third preset relationship, where the third preset relationship includes a mapping relationship between the first received signal strength and the first coverage level.

With reference to the second possible implementation manner of the third aspect, in a sixth possible implementation manner of the third aspect, when the downlink signal is the reference signal used for cell channel measurement, the determining, by the terminal, a first coverage level of the terminal according to the downlink signal includes:

measuring, by the terminal, a path loss between the terminal and the network device according to the downlink signal received in a preset period of time;

determining, by the terminal, a first path loss between the terminal and the network device according to all path losses measured in the preset period of time; and determining, by the terminal, the first coverage level of the terminal according to the first path loss and a fourth preset relationship, where the fourth preset relationship includes a mapping relationship between the first path loss and the first coverage level.

With reference to any one of the third aspect to the sixth possible implementation manner of the third aspect, in a seventh possible implementation manner of the third aspect, the method further includes:

sending, by the terminal, the first coverage level to the network device.

With reference to the seventh possible implementation manner of the third aspect, in an eighth possible implementation manner of the third aspect, after the sending, by the terminal, the first coverage level to the network device, the method further includes:

establishing, by the terminal, a service connection to the network device;

receiving, by the terminal, a service signal repeatedly sent by the network device, where a quantity of repetition times of the service signal is determined by the network device according to the first coverage level of the terminal; and determining, by the terminal, a second coverage level of the terminal according to a fifth preset relationship and the quantity of times of receiving the service signal when the service signal is successfully decoded, where the fifth preset relationship includes a mapping relationship between the second coverage level and the quantity of times of receiving the service signal when the terminal successfully decodes the service signal.

According to a fourth aspect, an embodiment of the present invention provides a wireless network coverage enhancement method, including:

sending, by a network device, a downlink signal to a terminal; and receiving, by the network device, an uplink signal that is sent by the terminal according to an uplink communications parameter, where the uplink communications parameter is determined by the terminal according to a first coverage level, and the first coverage level is determined by the terminal according to the downlink signal.

With reference to the fourth aspect, in a first possible implementation manner of the fourth aspect, the uplink communications parameter includes at least one of the following: a quantity of repetition times, channel bandwidth, transmit power, or a modulation and coding scheme that is used for sending the uplink signal by the terminal.

With reference to the fourth aspect or the first possible implementation manner of the fourth aspect, in a second possible implementation manner of the fourth aspect, the downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

With reference to any one of the fourth aspect to the second possible implementation manner of the fourth aspect, in a third possible implementation manner of the fourth aspect, after the sending, by a network device, a downlink signal to a terminal, the method further includes:

receiving, by the network device, the first coverage level sent by the terminal.

With reference to the third possible implementation manner of the fourth aspect, in a fourth possible implementation manner of the fourth aspect, after the receiving, by the network device, the first coverage level sent by the terminal, the method further includes:

establishing, by the network device, a service connection to the terminal, and repeatedly sending a service signal to the terminal according to the first coverage level, so that the terminal determines a second coverage level of the terminal according to the repeatedly-sent service signal; or performing, by the network device, resource scheduling on the terminal according to the first coverage level.

With reference to the second possible implementation manner of the fourth aspect, in a fifth possible implementation manner of the fourth aspect, when the uplink communications parameter includes the quantity of repetition times, the channel bandwidth, or the modulation and coding scheme that is used for sending the uplink signal, the method further includes:

receiving, by the network device, the uplink communications parameter sent by the terminal, and decoding the uplink signal according to the uplink communications parameter.

According to a fifth aspect, an embodiment of the present invention provides a wireless network coverage enhancement system, including: the terminal according to any one of the first aspect to the eighth possible implementation manner of the first aspect and the network device according to any one of the second aspect to the fifth possible implementation manner of the second aspect.

The embodiments of the present invention provide a wireless network coverage enhancement method, apparatus, and system. A terminal determines a first coverage level of the terminal according to a received downlink signal sent by a network device, determines an uplink communications parameter according to the first coverage level, and sends an uplink signal to the network device by using the uplink communications parameter, so as to implement coverage enhancement of a wireless network, and improve a probability of successfully receiving the uplink signal. Therefore, the network device does not need to send a NACK to the terminal, so that overheads of an air interface between the terminal and the network device are reduced, a period in which the terminal performs coverage enhancement is shortened, and power consumption of the terminal is reduced. In addition, by using the method provided in the embodiments of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement and enhancing performance of uplink communication.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
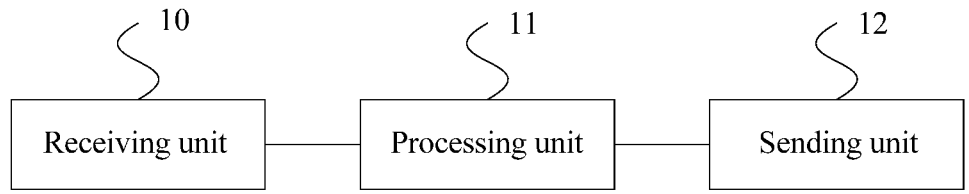
FIG. 1 is a schematic structural diagram of a first embodiment of a terminal according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal, that is, user equipment, involved in the embodiments of the present invention may be a wireless terminal. The wireless terminal may refer to a device that provides a user with voice and/or data connectivity, a handheld device with a wireless connection function, or another processing device connected to a wireless modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), user equipment (User Device), or user equipment (User Equipment).

A network device involved in this application may be a base station or may be an access point. The base station may refer to a device that is in an access network and communicates, over an air interface, with the wireless terminal by using one or more sectors. The base station may be configured to mutually convert a received over-the-air frame and an IP packet and serve as a router between the wireless terminal and a rest portion of the access network. The rest portion of the access network may include an Internet protocol (IP) network. The base station may further coordinate attribute management of the air interface. For example, the base station may be a base transceiver station (BTS, Base Transceiver Station) in GSM or CDMA, or may be a NodeB (NodeB) in WCDMA, or may be an evolved NodeB (NodeB, eNB, or e-NodeB, evolutional Node B) in LTE. This is not limited in this application.

FIG. 1 is a schematic structural diagram of a first embodiment of a terminal according to the present invention. As shown in FIG. 1, the terminal includes a receiving unit 10, a processing unit 11, and a sending unit 12.

The receiving unit 10 is configured to receive a downlink signal sent by a network device. The processing unit 11 is configured to determine a first coverage level of the terminal according to the downlink signal, and determine an uplink communications parameter according to the first coverage level. The sending unit 12 is configured to send an uplink signal to the network device according to the uplink communications parameter determined by the processing unit 11.

Specifically, the network device sends the downlink signal to the terminal. The downlink signal may be any signal delivered by the network device, for example, a broadcast signal, a common control signal, or a service signal. After receiving the downlink signal sent by the network device, the receiving unit 10 sends the downlink signal to the processing unit 11. The processing unit 11 determines the first coverage level of the terminal according to the downlink signal. Optionally, the processing unit 11 may determine the first coverage level of the terminal by measuring or decoding a downlink signal sent in a period of time.

It should be noted that, the first coverage level is used by the terminal to determine a value that needs to be increased in coverage performance relative to current coverage performance. For example, it is assumed that a coverage level of the terminal specifically includes three levels: a coverage level 0, a coverage level 1, and a coverage level 2, respectively. Coverage performance of the terminal corresponding to the coverage level 0 needs to be increased by 0 dB (that is, there is no need for enhancement), coverage performance of the terminal corresponding to the coverage level 1 needs to be increased by 0-10 dB, and coverage performance corresponding to the coverage level 2 needs to be increased by 10-20 dB. In consideration of complexity of coverage performance enhancement and system design, only a maximum value that needs to be increased in coverage performance is considered as a target of coverage performance enhancement of the terminal. That is, when determining that the first coverage level of the terminal is the coverage level 1, the processing unit 11 determines the uplink communications parameter according to the first coverage level, and the sending unit 12 sends the uplink signal to the network device according to the uplink communications parameter determined by the processing unit 11. Therefore, coverage performance of the terminal may be increased by 10 dB. The uplink communications parameter may be a quantity of repetition times of sending the uplink signal by the terminal to the network device, or may be transmit power for sending the uplink signal by the terminal to the network device, or may be channel bandwidth used when the terminal sends the uplink signal to the network device, or may be a modulation and coding scheme used when the terminal sends the uplink signal to the network device, or the like. The uplink communications parameter is not limited in this embodiment of the present invention, provided that the parameter is related to coverage performance. Optionally, according to the example exemplified above, when the processing unit 11 determines that the first coverage level of the terminal is the coverage level 1, the processing unit 11 may increase the coverage performance by 10 dB by using the determined uplink communications parameter.

Figure 2:
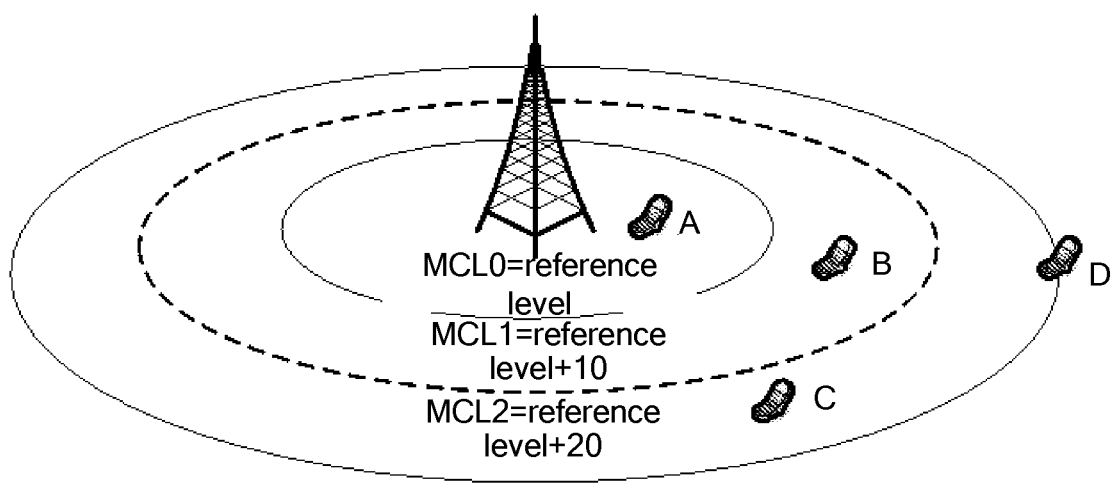
FIG. 2 is a schematic diagram of existing wireless network coverage according to the present invention.

Optionally, a maximum coupling loss (MCL) value may be used to represent coverage performance of a wireless network. Referring to FIG. 2, an MCL 0 represents coverage performance of an existing network, and an MCL 2 represents target coverage performance, of the network, that needs to be reached. An increase of 20 dB is used as an example. An MCL of the entire network is specific to a terminal with poorest coverage performance in a service area, and the terminal is also referred to as an edge user (such as a terminal D in FIG. 2). However, because coupling loss (CL) values of non-edge users (such as terminals A, B, and C in FIG. 2) in the service area are different from each other, CL values of different terminals may be used to represent coverage performance of the terminals. For example, in the foregoing FIG. 2, when a CL of the terminal A is less than the MCL 0, coverage performance of the terminal A is relatively good. Therefore, without coverage enhancement, the existing network can also serve the terminal A. When a CL of the terminal B is greater than the MCL 0 and less than an MCL 1, without coverage enhancement, the existing network cannot serve the terminal B. When a CL of the terminal C is greater than the MCL 1 and less than an MCL 2, without coverage enhancement, the existing network cannot serve the terminal C. The network cannot serve a terminal whose CL is greater than the MCL 2.

In the prior art, coverage performance of a wireless network is generally enhanced by using an HARQ or ARQ retransmission mechanism, and the HARQ or the ARQ is a transmission mechanism based on a MAC layer and/or a transmission mechanism based on an RLC layer. The terminal needs an ACK/NACK response mechanism of the network device to cooperate in performing the HARQ or ARQ retransmission mechanism, to improve a probability of successful receiving performed by the terminal. In this method, air-interface interaction is frequent, signaling overheads are large, an execution period of coverage enhancement is relatively long, and power consumption of the terminal is large. Furthermore, because a quantity of retransmissions is generally not set to a large value in consideration of factors such as a resource, a delay, and complexity of a communication procedure, coverage enhancement amplitude of the wireless network is limited. In addition, the terminal cannot effectively adjust coverage enhancement in a timely manner according to a change of a coverage environment in which the terminal is located, and execution efficiency of coverage enhancement is low. However, in this application, the terminal determines the first coverage level of the terminal according to the downlink signal delivered by the network device, and determines, by using the first coverage level, the uplink communications parameter used when sending the uplink signal to the network device, that is, whether the terminal repeatedly sends the uplink signal to the network device, or the quantity of repetition times of sending the uplink signal is determined by the first coverage level of the terminal. The network device does not need to send an ACK/NACK feedback (that is, the terminal does not need to wait for an ACK feedback or a NACK feedback) to the terminal. Therefore, an execution period of coverage enhancement of the wireless network is relatively short, and power consumption of the terminal and signaling overheads are reduced. Furthermore, a flexible quantity of repetition times of sending leads to a relatively large increase in coverage performance of the wireless network. In addition, the terminal directly determines the coverage level of the terminal according to the downlink signal, and effectively adjusts the uplink communications parameter in a timely manner according to the coverage level, so that the terminal can effectively adjust coverage enhancement in a timely manner, thereby improving execution efficiency of coverage enhancement, and enhancing performance of uplink communication.

According to the terminal provided in this embodiment of the present invention, a receiving unit receives a downlink signal sent by a network device, a processing unit determines a first coverage level of the terminal according to the downlink signal, and determines an uplink communications parameter according to the first coverage level, and a sending unit sends an uplink signal to the network device according to the uplink communications parameter, so as to implement coverage enhancement of a wireless network. According to the terminal provided in this embodiment of the present invention, a probability of successfully receiving the uplink signal is improved. Therefore, the network device does not need to send an ACK feedback or a NACK feedback to the terminal, so that overheads of an air interface between the terminal and the network device are reduced, a period in which the terminal performs coverage enhancement is shortened, and power consumption of the terminal is reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

Further, the downlink signal may include at least one of: a first signal transmitted on a downlink synchronization channel (SCH), a second signal transmitted on a common transport channel (CCH), a third signal transmitted on a broadcast control channel (BCCH), a repeatedly-sent sequence signal used for downlink synchronization, a reference signal used for cell channel measurement, or a signal transmitted on a BCCH carrier.

Optionally, the repeatedly-sent sequence signal used for downlink synchronization may be a primary synchronization signal (PSS), or may be a secondary synchronization signal (SSS). The reference signal used for cell channel measurement may be a cell-specific reference signal (CRS).

Optionally, when the downlink signal includes multiple signals of the first signal, the second signal, the third signal, the repeatedly-sent sequence signal used for downlink synchronization, the reference signal used for cell channel measurement, and the signal transmitted on the BCCH carrier, the terminal may determine one first coverage level according to each downlink signal, and then correspondingly analyze or calculate multiple first coverage levels to obtain the most accurate first coverage level of the terminal. It should be noted that, herein, corresponding analysis or calculation of the multiple first coverage levels may be any calculation such as weighted averaging, arithmetic averaging, or function mapping, provided that an accurate first coverage level can be obtained.

On the basis of the foregoing embodiment shown in FIG. 1, in a first possible implementation manner of this embodiment, this embodiment involves a specific process in which the terminal performs coverage enhancement when the downlink signal is any one of the first signal, the second signal, or the third signal. On the basis of the foregoing embodiment, the processing unit 11 is specifically configured to: when the downlink signal is successfully decoded, determine the first coverage level of the terminal according to a first preset relationship and a quantity of times of receiving the downlink signal by the receiving unit 10, where the first preset relationship includes a mapping relationship between the first coverage level and the quantity of times of receiving the downlink signal when the terminal successfully decodes the downlink signal.

Specifically, if the downlink signal is the first signal transmitted on the SCH, when receiving the first signal for the first time, the receiving unit 10 sends the first signal to the processing unit 11. The processing unit 11 decodes the first signal, and if decoding is successful, determines that a quantity of repetition times of the first signal is 1; if decoding is unsuccessful, performs soft combination on a next first signal and the previous first signal that fails to be decoded, performs decoding again, and so on, until the first signal is successfully decoded. A quantity of times of receiving the first signal by the time the first signal is successfully decoded is determined.

The processing unit 11 matches the determined quantity of repetition times of the first signal with the first preset relationship, so as to determine the first coverage level of the terminal. The first preset relationship may include multiple preset threshold ranges, and each preset threshold range corresponds to one coverage level. Optionally, the first preset relationship may be in a form of a mapping table. Herein, for a simple example, it is assumed that a coverage level of the terminal specifically includes three levels: a coverage level 0, a coverage level 1, and a coverage level 2, respectively. Coverage performance corresponding to the coverage level 0 needs to be increased by 0 dB, coverage performance corresponding to the coverage level 1 needs to be increased by 10 dB, and coverage performance corresponding to the coverage level 2 needs to be increased by 20 dB. A preset threshold range corresponding to the coverage level 0 is "a first quantity of repetition times=1", a preset threshold range corresponding to the coverage level 1 is "1<a first quantity of repetition times≤4", and a preset threshold range corresponding to the coverage level 2 may be "4<a first quantity of repetition times≤8". For details, reference may be made to Table 1:

TABLE 1

| First preset relationship | Coverage level | Increase in coverage performance |
| --- | --- | --- |
| A first quantity of repetition times = 1 | 0 | 0 dB |
| 1 < a first quantity of repetition times ≤ 4 | 1 | 10 dB |
| 4 < a first quantity of repetition times ≤ 8 | 2 | 20 dB |

It should be noted that, the first preset relationship in the foregoing Table 1 is only an example. A form of the first preset relationship or a preset threshold range is not limited in the present invention.

After determining the first coverage level of the terminal, the processing unit 11 determines, according to the first coverage level, the uplink communications parameter used when sending the uplink signal to the network device.

According to the terminal provided in this embodiment of the present invention, a receiving unit receives a downlink signal sent by a network device, and a processing unit determines a first coverage level of the terminal according to a first preset relationship and a quantity of times of receiving the downlink signal by the receiving unit when decoding is successful, and determines, according to the first coverage level, an uplink communications parameter used when the terminal sends an uplink signal to the network device, so that a sending unit sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 1, in a second possible implementation manner of this embodiment, this embodiment involves a specific process in which the terminal performs coverage enhancement when the downlink signal is the repeatedly-sent sequence signal used for downlink synchronization. The repeatedly-sent sequence signal used for downlink synchronization (for example, a PSS or an SSS) has a characteristic of self-repetition. The solution in this embodiment is applicable to a new air interface scenario. On the basis of the foregoing embodiment shown in FIG. 1, the processing unit 11 is specifically configured to: perform, at a moment of receiving the downlink signal, energy accumulation on all downlink signals received by the receiving unit 10; correlate a signal obtained after energy accumulation and a preset reference signal of the downlink signal, to obtain a correlation value of the downlink signal; and when the correlation value of the downlink signal exceeds a preset threshold, determine the first coverage level of the terminal according to a second preset relationship and a quantity of times of receiving the downlink signal by the receiving unit 10, where the second preset relationship includes a mapping relationship between the first coverage level and the quantity of times of receiving the downlink signal by the terminal when the correlation value of the downlink signal exceeds the preset threshold.

Specifically, that the downlink signal is a PSS is used as an example (for a case in which the downlink signal is an SSS, reference may be made to the following execution process). When receiving the PSS for the first time, the receiving unit 10 sends the PSS to the processing unit 11. The processing unit 11 correlates the PSS and a reference signal that is of the PSS and that is preset inside the terminal (the PSS that is sent by the network device and is received by the terminal is a PSS that passes through a wireless channel, and the PSS has been actually affected by a factor such as channel attenuation or interference and is not an ideal PSS that is originally sent by the network device to the terminal, but the reference signal that is of the PSS and that is preset inside the terminal is the ideal PSS that does not pass through the wireless channel), to obtain a correlation value of the PSS, and determines whether the correlation value of the PSS exceeds the preset threshold. When the preset threshold is exceeded, the processing unit 11 determines that a quantity of repetition times of the PSS is 1. When the threshold is not exceeded, the processing unit 11 performs energy accumulation on a next received PSS and the previous PSS, calculates a correlation value of a PSS obtained after accumulation (that is, the PSS obtained after accumulation and the reference signal that is of the PSS and that is preset inside the terminal are correlated), determines whether the correlation value exceeds the preset threshold, and so on, until the processing unit 11 determines that the correlation value of the PSS exceeds the preset threshold. A quantity of times of receiving the PSS by the time the correlation value of the PSS is greater than the preset threshold is determined.

The processing unit 11 matches the second preset relationship with the quantity of times of receiving the PSS by the receiving unit 10 when the determined correlation value of the PSS is greater than the preset threshold, so as to determine the first coverage level of the terminal. The second preset relationship may include multiple preset threshold ranges, and each preset threshold range corresponds to one coverage level. Optionally, the second preset relationship may be in a form of a mapping table. Herein, for a simple example, it is assumed that a coverage level of the terminal may specifically include three levels: a coverage level 0, a coverage level 1, and a coverage level 2, respectively. Coverage performance corresponding to the coverage level 0 needs to be increased by 0 dB, coverage performance corresponding to the coverage level 1 needs to be increased by 10 dB, and coverage performance corresponding to the coverage level 2 needs to be increased by 20 dB. A preset threshold range corresponding to the coverage level 0 is "a second quantity of repetition times=1", a preset threshold range corresponding to the coverage level 1 is "1<a second quantity of repetition times≤4", and a preset threshold range corresponding to the coverage level 2 may be "4<a second quantity of repetition times≤8". For details, reference may be made to Table 2:

TABLE 2

| Second preset relationship | Coverage level | Increase in coverage performance |
| --- | --- | --- |
| A second quantity of repetition times = 1 | 0 | 0 dB |
| 1 < a second quantity of repetition times ≤ 4 | 1 | 10 dB |
| 4 < a second quantity of repetition times ≤ 8 | 2 | 20 dB |

It should be noted that, the second preset relationship in the foregoing Table 2 is only an example. A form of the second preset relationship or a preset threshold range is not limited in the present invention.

After determining the first coverage level of the terminal, the processing unit 11 determines, according to the first coverage level, the uplink communications parameter used when sending the uplink signal to the network device.

According to the terminal provided in this embodiment of the present invention, a receiving unit receives a downlink signal sent by a network device, and a processing unit determines a first coverage level of the terminal according to a second preset relationship and a quantity of times of receiving the downlink signal by the receiving unit when a correlation value of the downlink signal exceeds a preset threshold, and determines, according to the first coverage level, an uplink communications parameter used when the terminal sends an uplink signal to the network device, so that a sending unit sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 1, in a third possible implementation manner of this embodiment, this embodiment involves a specific process in which the terminal performs coverage enhancement when the downlink signal is the signal transmitted on the BCCH carrier. On the basis of the foregoing embodiment shown in FIG. 1, the processing unit 11 is specifically configured to: measure received signal strength of the downlink signal received by the receiving unit 10 in a preset period of time, determine first received signal strength according to the received signal strength that is of the downlink signal and is measured in the preset period of time, and determine the first coverage level of the terminal according to the first received signal strength and a third preset relationship, where the third preset relationship includes a mapping relationship between the first received signal strength and the first coverage level.

Specifically, the network device sends, to the terminal in the preset period of time, the signal transmitted on the BCCH carrier, that is, the signal is carried on a BCCH and is sent to the terminal. The receiving unit 10 transmits, to the processing unit 11, the received signal transmitted on the BCCH carrier. The processing unit 11 measures received signal strength of the signal transmitted on the BCCH carrier, and obtains first received signal strength by means of calculation according to the received signal strength of the signal transmitted on the BCCH carrier. Optionally, the first received signal strength may be average received signal strength of signals transmitted on the BCCH carrier, or may be received signal strength obtained by means of any calculation performed by the processing unit 11 on received signal strength of all signals transmitted on the BCCH carrier in the preset period of time.

The processing unit 11 matches the determined first received signal strength with the third preset relationship, so as to determine the first coverage level of the terminal. The third preset relationship may include multiple preset threshold ranges, and each preset threshold range corresponds to one coverage level. Optionally, the third preset relationship may be in a form of a mapping table. It is assumed that a coverage level of the terminal may specifically include three levels: a coverage level 0, a coverage level 1, and a coverage level 2, respectively. Coverage performance corresponding to the coverage level 0 needs to be increased by 0 dB, coverage performance corresponding to the coverage level 1 needs to be increased by 10 dB, and coverage performance corresponding to the coverage level 2 needs to be increased by 20 dB. A preset threshold range corresponding to the coverage level 0 is A, a preset threshold range corresponding to the coverage level 1 is B, and a preset threshold range corresponding to the coverage level 2 may be C. For details, reference may be made to Table 3:

TABLE 3

| Third preset relationship | Coverage level | Increase in coverage performance |
| --- | --- | --- |
| A | 0 | 0 dB |
| B | 1 | 10 dB |
| C | 2 | 20 dB |

It should be noted that, the third preset relationship in the foregoing Table 3 is only an example. A form of the third preset relationship or a preset threshold range is not limited in the present invention.

After determining the first coverage level of the terminal, the processing unit 11 determines, according to the first coverage level, the uplink communications parameter used when sending the uplink signal to the network device.

According to the terminal provided in this embodiment of the present invention, a receiving unit receives a downlink signal sent by a network device, and a processing unit measures received signal strength of each downlink signal received in a preset period of time, to obtain first received signal strength of these downlink signals, and determines a first coverage level of the terminal according to the first received signal strength and a third preset relationship, so as to determine, according to the first coverage level, an uplink communications parameter used when the terminal sends an uplink signal to the network device. Therefore, a sending unit sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 1, in a fourth possible implementation manner of this embodiment, this embodiment involves a specific process in which the terminal performs coverage enhancement when the downlink signal is the reference signal used for cell channel measurement. On the basis of the foregoing embodiment shown in FIG. 1, the processing unit 11 is specifically configured to: measure a path loss between the terminal and the network device according to the downlink signal received by the receiving unit 10 in a preset period of time, determine a first path loss between the terminal and the network device according to all path losses measured in the preset period of time, and determine the first coverage level of the terminal according to the first path loss and a fourth preset relationship, where the fourth preset relationship includes a mapping relationship between the first path loss and the first coverage level.

Specifically, that the downlink signal is a CRS is used as an example. The network device repeatedly sends the CRS to the terminal in the preset period of time. The receiving unit 10 sends each received CRS to the processing unit 11. The processing unit 11 measures the path loss (one CRS corresponds to one path loss) between the terminal and the network device according to each CRS received by the receiving unit 10 in the preset period of time, and obtains the first path loss between the terminal and the network device by means of calculation according to these path losses. Optionally, the first path loss may be an average path loss between the terminal and the network device, or may be a path loss obtained by means of any calculation performed by the processing unit 11 on all the path losses between the terminal and the network device in the preset period of time.

The processing unit 11 matches the determined first path loss with the fourth preset relationship, so as to determine the first coverage level of the terminal. The fourth preset relationship may include multiple preset threshold ranges, and each preset threshold range corresponds to a different coverage level. Optionally, the fourth preset relationship may be in a form of a mapping table. It is assumed that a coverage level of the terminal may specifically include three levels: a coverage level 0, a coverage level 1, and a coverage level 2, respectively. Coverage performance corresponding to the coverage level 0 needs to be increased by 0 dB, coverage performance corresponding to the coverage level 1 needs to be increased by 10 dB, and coverage performance corresponding to the coverage level 2 needs to be increased by 20 dB. A preset threshold range corresponding to the coverage level 0 is D, a preset threshold range corresponding to the coverage level 1 is E, and a preset threshold range corresponding to the coverage level 2 may be F. For details, reference may be made to Table 4:

TABLE 4

| Fourth preset relationship | Coverage level | Increase in coverage performance |
| --- | --- | --- |
| D | 0 | 0 dB |
| E | 1 | 10 dB |
| F | 2 | 20 dB |

It should be noted that, the fourth preset relationship in the foregoing Table 4 is only an example. A form of the fourth preset relationship or a preset threshold range is not limited in the present invention.

After determining the first coverage level of the terminal, the processing unit 11 determines, according to the first coverage level, the uplink communications parameter used when sending the uplink signal to the network device.

According to the terminal provided in this embodiment of the present invention, a receiving unit receives a downlink signal sent by a network device, and a processing unit measures a path loss between the terminal and the network device according to each CRS received by the receiving unit in a preset period of time, to obtain a first path loss between the terminal and the terminal device, and determines a first coverage level of the terminal according to the first path loss and a fourth preset relationship, so as to determine, according to the first coverage level, an uplink communications parameter used when the terminal sends an uplink signal to the network device. Therefore, a sending unit sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of any one of the foregoing possible implementation manners, in a fifth possible implementation manner of this embodiment of the present invention, this embodiment involves a specific process in which the terminal sends the determined first coverage level to the network device, so that the network device performs proper resource scheduling on the terminal. The sending unit 12 is further configured to send the first coverage level to the network device.

Specifically, after determining the first coverage level of the terminal according to the downlink signal, the processing unit 11 sends the first coverage level to the network device by using the sending unit 12. Optionally, the first coverage level may be sent to the network device directly in an explicit manner (directly in a manner of a message information element), or the first coverage level may be carried in a physical signal and be sent to the network device in an implicit manner. Optionally, in the explicit sending manner, the first coverage level may be sent to the network device by using a channel request message sent on a random access channel (RACH). In the implicit sending manner, the terminal may carry information about the first coverage level by using a quantity of repetition times of sending the uplink signal or other physical layer processing (for example, manners such as symbol rotation, a signal cyclic shift, adding or scrambling of a special sequence).

After receiving the first coverage level, the network device performs proper resource scheduling on uplink and downlink resources of the terminal.

According to the terminal provided in this embodiment of the present invention, after determining a first coverage level of the terminal according to a downlink signal, a processing unit sends the first coverage level to a network device by using a sending unit, so that scheduling of uplink and downlink resources of the terminal by the network device is more accurate, and resource utilization is improved.

On the basis of any one of the foregoing possible implementation manners, in a sixth possible implementation manner of this embodiment of the present invention, this embodiment involves a specific process in which the terminal updates the coverage level. Further, the processing unit 11 is further configured to establish a service connection to the network device. The receiving unit 10 is further configured to receive a service signal repeatedly sent by the network device, where a quantity of repetition times of the service signal is determined by the network device according to the first coverage level of the terminal. The processing unit 11 is further configured to determine a second coverage level of the terminal according to a fifth preset relationship and the quantity of times of receiving the service signal when the service signal is successfully decoded, where the fifth preset relationship includes a mapping relationship between the second coverage level and the quantity of times of receiving the service signal when the terminal successfully decodes the service signal.

Specifically, in any one of the foregoing embodiments, the terminal performs service signal communication with the network device only after determining the first coverage level of the terminal. The service signal may be a downlink data signal.

The receiving unit 10 receives the service signal repeatedly sent by the network device. The quantity of repetition times of the service signal is determined by the network device according to the first coverage level that is of the terminal and that is reported by the sending unit 12. It is assumed that the quantity is n, that is, the first coverage level of the terminal determines that the terminal can perform successful decoding only after the service signal is repeated for n times. Therefore, a quantity of times of sending the service signal by the network device is n. The receiving unit 10 sends all received service signals to the processing unit 11. The processing unit 11 decodes the service signal. When decoding is successful, the processing unit records the quantity of times of receiving the service signal by the time decoding is successful. It is assumed that the quantity is m (m is less than n), that is, in this case, the terminal can successfully decode the service signal after the service signal is repeated for only m times. Therefore, the processing unit 11 matches the fifth preset relationship with the quantity (that is, m) of times of receiving the service signal when decoding is successful, and determines the second coverage level of the terminal, so as to update the original first coverage level of the terminal to the second coverage level. Optionally, the terminal may send the second coverage level to the network device by using the sending unit 12, so that the network device allocates a proper resource to the terminal according to the second coverage level, thereby avoiding resource waste caused by redundant sending. Optionally, the terminal may adjust, in a timely manner according to the second coverage level, an uplink communications parameter used when performing service communication with the network device, such as a quantity of repetition times, channel bandwidth, transmit power, or a modulation and coding scheme.

According to the terminal provided in this embodiment of the present invention, a receiving unit receives a service signal repeatedly sent by a network device. A quantity of repetition times of the service signal is determined by the network device according to a first coverage level of the terminal. A processing unit determines a second coverage level of the terminal according to a fifth preset relationship and a quantity of times of receiving the service signal when decoding is successful. According to the terminal provided in this embodiment of the present invention, the coverage level of the terminal is updated in a timely manner, and an uplink communications parameter is effectively adjusted in a timely manner according to the updated coverage level, so that the terminal can effectively adjust coverage enhancement in a timely manner, thereby improving execution efficiency of coverage enhancement, and enhancing performance of uplink communication.

Optionally, on the basis of any one of the foregoing possible implementation manners, the uplink communications parameter that is determined by the terminal according to the first coverage level of the terminal may be at least one of: the quantity of repetition times, the channel bandwidth, the transmit power, or the modulation and coding scheme that is used when the terminal sends the uplink signal.

It should be noted that, because the terminal may use multiple types of channel bandwidth to communicate with the network device, herein, the processing unit 11 determines, according to the first coverage level, the channel bandwidth used when the terminal sends the uplink signal to the network device, so that the sending unit 12 may send the uplink signal to the network device for a preset quantity of repetition times by using the determined channel bandwidth. There is a correspondence between the preset quantity of repetition times and the determined channel bandwidth that is used for sending the uplink signal by the terminal. For example, narrower channel bandwidth that is used for sending the uplink signal by the sending unit 12 leads to more concentrated energy of the uplink signal sent by the sending unit 12, and therefore leads to a smaller preset quantity of repetition times. Therefore, the terminal can send the uplink signal to the network device for a relatively appropriate quantity of repetition times, and signaling overheads of the terminal are reduced.

In one aspect, the processing unit 11 may determine, according to the determined first coverage level, the channel bandwidth and the quantity of repetition times that are used when the terminal sends the uplink signal to the network device. That is, the processing unit 11 simultaneously determines, according to the first coverage level, the channel bandwidth and the quantity of repetition times that are suitable for the terminal to send the uplink signal. The channel bandwidth and the quantity of repetition times that are determined herein are comprehensively considered by the processing unit 11 according to the first coverage level, the quantity of repetition times, and the channel bandwidth. For example, the processing unit 11 may determine a quantity A of repetition times according to the first coverage level, or may determine channel bandwidth B according to the first coverage level. Furthermore, the processing unit 11 may perform fine adjustment on the determined quantity A of repetition times and the determined channel bandwidth B according to an actual wireless environment (for example, fast fading of a channel and channel noise) in a wireless network, to select proper channel bandwidth a and a proper quantity b of repetition times, and send the uplink signal on the channel bandwidth a for the quantity b of repetition times. In this method, the terminal does not need to send the uplink signal repeatedly for many times to the network device, and signaling overheads of the terminal are reduced.

In another aspect, the terminal in this embodiment of the present invention may use multiple modulation and coding schemes when communicating with the network device. The processing unit 11 determines, according to the first coverage level, the modulation and coding scheme used when the terminal sends the uplink signal to the network device. For example, a higher first coverage level determined by the terminal indicates that a wireless channel environment in which the terminal is currently located is relatively poor, and current coverage performance needs to be increased in relatively large amplitude. Therefore, the terminal uses a lower-order modulation manner and a coding manner with relatively high redundancy, so as to avoid redundant sending caused by using an inappropriate modulation and coding scheme by the terminal, and reduce signaling overheads of the terminal.

According to the terminal provided in this embodiment, when performing uplink communication, the terminal may use an uplink communications parameter that is suitable for the terminal to send an uplink signal, thereby reducing signaling overheads of the terminal.

Figure 3:
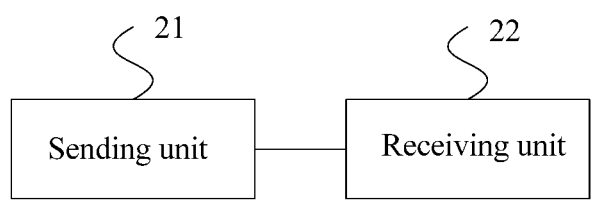
FIG. 3 is a schematic structural diagram of a first embodiment of a network device according to the present invention.

FIG. 3 is a schematic structural diagram of a first embodiment of a network device according to the present invention. As shown in FIG. 3, the network device includes a sending unit 21 and a receiving unit 22. The sending unit 21 is configured to send a downlink signal to a terminal. The receiving unit 22 is configured to receive an uplink signal that is sent by the terminal according to an uplink communications parameter determined by the terminal, where the uplink communications parameter is determined by the terminal according to a first coverage level, and the first coverage level is determined by the terminal according to the downlink signal.

Specifically, the sending unit 21 sends the downlink signal to the terminal. The downlink signal may be any signal delivered by the network device, for example, a broadcast signal, a common control signal, or a service signal. After receiving the downlink signal sent by the network device, the terminal determines the first coverage level of the terminal according to the downlink signal. Optionally, the terminal may determine the first coverage level of the terminal by measuring or decoding a downlink signal repeatedly sent in a period of time.

The first coverage level may correspond to a value that needs to be increased in coverage performance. For example, it is assumed that a coverage level of the terminal may specifically include three levels: a coverage level 0, a coverage level 1, and a coverage level 2, respectively. Coverage performance corresponding to the coverage level 0 needs to be increased by 0 dB (that is, there is no need for enhancement), coverage performance corresponding to the coverage level 1 needs to be increased by 0-10 dB, and coverage performance corresponding to the coverage level 2 needs to be increased by 10-20 dB. In consideration of complexity of coverage performance enhancement and system design, only a maximum value that needs to be increased in coverage performance is considered as a target of coverage performance enhancement of the terminal. That is, when determining that the first coverage level of the terminal is the coverage level 1, the terminal may determine the uplink communications parameter according to the first coverage level to perform configuration, so that the receiving unit 22 may receive the uplink signal that is sent by the terminal according to the uplink communications parameter. Therefore, coverage performance may be increased by 10 dB. The uplink communications parameter may be a quantity of repetition times of sending the uplink signal by the terminal to the network device, or may be power for sending the uplink signal by the terminal to the network device, or may be channel bandwidth used when the terminal sends the uplink signal to the network device, or may be a modulation and coding scheme used when the terminal sends the uplink signal to the network device, or the like. The uplink communications parameter is not limited in this embodiment of the present invention, provided that the parameter is related to coverage performance. Optionally, according to the example exemplified above, when determining that the first coverage level of the terminal is the coverage level 1, the terminal may increase the coverage performance by 10 dB.

In the prior art, coverage performance of a wireless network is generally enhanced by using an HARQ or ARQ retransmission mechanism, and the HARQ or the ARQ is a transmission mechanism based on a MAC layer and/or a transmission mechanism based on an RLC layer. The terminal needs an ACK/NACK response mechanism of the network device to cooperate in performing the HARQ or ARQ retransmission mechanism, to improve a probability of successful receiving performed by the terminal. In this method, air-interface interaction is frequent, signaling overheads are large, an execution period of coverage enhancement is relatively long, and power consumption of the terminal is large. Furthermore, because a quantity of retransmissions is generally not set to a large value in consideration of factors such as a resource, a delay, and complexity of a communication procedure, coverage enhancement amplitude of the wireless network is limited. In addition, the terminal cannot effectively adjust coverage enhancement in a timely manner according to a change of a coverage environment in which the terminal is located, and execution efficiency of coverage enhancement is low. However, in this application, the terminal determines the first coverage level of the terminal according to the downlink signal delivered by the network device, and determines, by using the first coverage level, the uplink communications parameter used when sending the uplink signal to the network device, that is, whether the terminal repeatedly sends the uplink signal to the network device, or the quantity of repetition times of sending the uplink signal is determined by the first coverage level of the terminal. The network device does not need to send an ACK/NACK feedback (that is, the terminal does not need to wait for an ACK feedback or a NACK feedback) to the terminal. Therefore, an execution period of coverage enhancement of the wireless network is relatively short, and power consumption of the terminal and signaling overheads are reduced. Furthermore, a flexible quantity of repetition times of sending leads to a relatively large increase in coverage performance of the wireless network. In addition, the terminal directly determines the coverage level of the terminal according to the downlink signal, and effectively adjusts the uplink communications parameter in a timely manner according to the coverage level, so that the terminal can effectively adjust coverage enhancement in a timely manner, thereby improving execution efficiency of coverage enhancement, and enhancing performance of uplink communication.

According to the network device provided in this embodiment of the present invention, a sending unit sends a downlink signal to a terminal, so that the terminal determines a first coverage level of the terminal according to the downlink signal, and determines an uplink communications parameter according to the first coverage level. Therefore, a receiving unit may receive an uplink signal that is sent by the terminal according to the determined uplink communications parameter, so as to implement coverage enhancement of a wireless network. According to the network device provided in this embodiment of the present invention, a probability of successfully receiving the uplink signal is improved. Therefore, the network device does not need to send an ACK feedback or a NACK feedback to the terminal, so that overheads of an air interface between the terminal and the network device are reduced, a period in which the terminal performs coverage enhancement is shortened, and power consumption of the terminal is reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

Further, the downlink signal includes one of a first signal transmitted on an SCH, a second signal transmitted on a CCH, a third signal transmitted on a BCCH, a repeatedly-sent sequence signal used for downlink synchronization, a reference signal used for cell channel measurement, or a signal transmitted on a BCCH carrier.

Optionally, the repeatedly-sent sequence signal used for downlink synchronization may be a PSS, or may be an SSS. The reference signal used for cell channel measurement may be a CRS.

Further, the uplink communications parameter may be a quantity of repetition times, channel bandwidth, transmit power, or a modulation and coding scheme that is used for sending the uplink signal by the terminal.

It should be noted that, because the terminal may use multiple types of channel bandwidth to communicate with the network device, herein, the terminal determines, according to the first coverage level, the channel bandwidth used when the terminal sends the uplink signal to the network device, so that the terminal may send the uplink signal to the network device for a preset quantity of repetition times by using the determined channel bandwidth. There is a correspondence between the preset quantity of repetition times and the determined channel bandwidth that is used for sending the uplink signal by the terminal. For example, narrower channel bandwidth that is used for sending the uplink signal by the terminal leads to more concentrated energy of the uplink signal sent by the terminal, and therefore leads to a smaller preset quantity of repetition times. Therefore, the terminal can send the uplink signal to the network device for a relatively appropriate quantity of repetition times, and signaling overheads of the terminal are reduced.

In another aspect, the terminal may determine, according to the determined first coverage level, the channel bandwidth and the quantity of repetition times that are used when the terminal sends the uplink signal to the network device. That is, the terminal simultaneously determines, according to the first coverage level, the channel bandwidth and the quantity of repetition times that are suitable for the terminal to send the uplink signal. The channel bandwidth and the quantity of repetition times that are determined herein are comprehensively considered by the terminal according to the first coverage level, the quantity of repetition times, and the channel bandwidth. For example, the terminal may determine a quantity A of repetition times according to the first coverage level, or may determine channel bandwidth B according to the first coverage level. Furthermore, the terminal may perform fine adjustment on the determined quantity A of repetition times and the determined channel bandwidth B according to an actual wireless environment (for example, fast or slow fading of a channel and channel noise) in a wireless network, to select proper channel bandwidth a and a proper quantity b of repetition times, and send the uplink signal on the channel bandwidth a for the quantity b of repetition times. In this method, the terminal does not need to send the uplink signal repeatedly for many times to the network device, and signaling overheads of the terminal are reduced.

In another aspect, the terminal in this embodiment of the present invention may use multiple modulation and coding schemes when communicating with the network device. The terminal determines, according to the first coverage level, the modulation and coding scheme used when the terminal sends the uplink signal to the network device. For example, a higher first coverage level determined by the terminal indicates that a wireless channel environment in which the terminal is currently located is relatively poor, and current coverage performance needs to be increased in relatively large amplitude. Therefore, the terminal uses a lower-order modulation manner and a coding manner with relatively high redundancy, so as to avoid redundant sending caused by using an inappropriate modulation and coding scheme by the terminal, and reduce signaling overheads of the terminal.

According to the network device provided in this embodiment, a terminal may determine a first coverage level according to a downlink signal delivered by the network device, and determine, according to the first coverage level, an uplink communications parameter that is suitable for the terminal to send an uplink signal and that may be used by the terminal when performing uplink communication, thereby reducing signaling overheads of the terminal.

Figure 4:
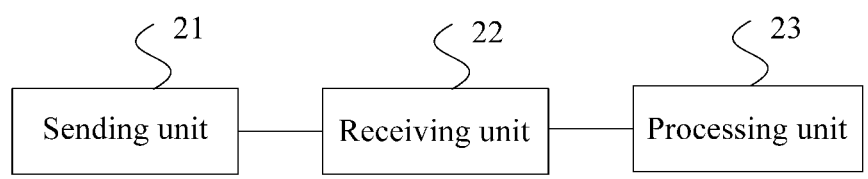
FIG. 4 is a schematic structural diagram of a second embodiment of a network device according to the present invention.

FIG. 4 is a schematic structural diagram of a second embodiment of a network device according to the present invention. On the basis of the foregoing embodiment, this embodiment involves a specific process in which the network device receives the first coverage level sent by the terminal, and performs resource scheduling on the terminal according to the first coverage level. Further, the network device may further include a processing unit 23. The receiving unit 22 is further configured to receive the first coverage level sent by the terminal. The processing unit 23 is configured to perform resource scheduling on the terminal according to the first coverage level after the receiving unit 22 receives the first coverage level sent by the terminal.

Specifically, after determining the first coverage level of the terminal, the terminal sends the first coverage level to the network device, and the receiving unit 22 receives the first coverage level, so that the processing unit 23 may calculate an uplink or downlink resource according to the first coverage level, and perform proper resource scheduling on the terminal. Optionally, the network device may send scheduling information to the terminal. The scheduling information may include a size of the uplink or downlink resource, so that the terminal learns of a size of a time-frequency resource that should be used when performing uplink communication. Optionally, the terminal may send the first coverage level to the network device directly in an explicit manner (directly in a manner of a message information element), or the first coverage level may be carried in a physical signal characteristic and be sent to the network device in an implicit manner. Optionally, in the explicit sending manner, the first coverage level may be sent to the network device by using a channel request message sent on a RACH. In the implicit sending manner, the terminal may carry information about the first coverage level by using a quantity of repetition times of uplink sending or other physical layer processing (for example, manners such as symbol rotation, a signal cyclic shift, adding or scrambling of a special sequence).

According to the network device provided in this embodiment of the present invention, a receiving unit receives a first coverage level sent by a terminal, and a processing unit performs resource scheduling on the terminal according to the first coverage level, so that scheduling of uplink and downlink resources of the terminal by the network device is more accurate, and resource utilization is improved.

Continuing to refer to FIG. 4, on the basis of the foregoing embodiment, this embodiment involves a specific process in which the network device establishes a service connection to the terminal, and sends a service signal to the terminal, so that the terminal updates the coverage level of the terminal in a timely manner. Further, the processing unit 23 is further configured to establish a service connection to the terminal after the receiving unit 22 receives the first coverage level sent by the terminal. The sending unit 21 is further configured to repeatedly send a service signal to the terminal according to the first coverage level, so that the terminal determines a second coverage level of the terminal according to the repeatedly-sent service signal.

Specifically, in any one of foregoing embodiments, the processing unit 23 establishes service communication with the terminal only after the receiving unit 22 receives the first coverage level sent by the terminal.

The sending unit 21 repeatedly sends the service signal to the terminal according to the first coverage level received by the receiving unit 22. The service signal may be a downlink data signal, a downlink voice signal, a downlink video signal, or the like. A quantity of repetition times of the service signal is determined by the processing unit 23 according to the first coverage level reported by the terminal. It is assumed that the quantity is n, that is, the first coverage level of the terminal determines that the terminal can perform successful decoding only after the network device delivers the service signal for n times. Therefore, the processing unit 23 determines, according to the first coverage level received by the receiving unit 22, that the quantity of times of sending the service signal is n. The terminal decodes the service signal. When decoding is successful, the terminal determines the quantity of times of receiving the service signal by the time decoding is successful. It is assumed that the quantity is m (m is less than n), that is, in this case, the terminal can successfully decode the service signal after the network device delivers the service signal for only m times. Therefore, the terminal matches the fifth preset relationship with the quantity (that is, m) of times of receiving the service signal when decoding is successful, and determines the second coverage level of the terminal, so as to update the original first coverage level of the terminal to the second coverage level. Optionally, the terminal may send the second coverage level to the network device, so that the network device allocates a proper resource to the terminal according to the second coverage level, thereby avoiding resource waste caused by redundant sending. Optionally, the terminal may adjust, in a timely manner according to the second coverage level, an uplink communications parameter used when performing service communication with the network device, such as a quantity of repetition times, channel bandwidth, transmit power, or a modulation and coding scheme.

According to the network device provided in this embodiment of the present invention, a processing unit establishes service communication with a terminal after a receiving unit receives a first coverage level sent by the terminal, and a sending unit repeatedly sends a service signal to the terminal according to the first coverage level, so that the terminal determines a second coverage level of the terminal according to the repeatedly-sent service signal. According to the network device provided in this embodiment of the present invention, the coverage level of the terminal is updated in a timely manner, and an uplink communications parameter is effectively adjusted in a timely manner according to the updated coverage level, so that the terminal can effectively adjust coverage enhancement in a timely manner, thereby improving execution efficiency of coverage enhancement, and enhancing performance of uplink communication.

Further, on the basis of the foregoing embodiment shown in FIG. 4, when the uplink communications parameter includes the quantity of repetition times, the channel bandwidth, or the modulation and coding scheme that is used for sending the uplink signal by the terminal, the receiving unit 22 is further configured to receive the uplink communications parameter sent by the terminal, and the processing unit 23 is further configured to decode the uplink signal according to the uplink communications parameter.

Optionally, when the uplink communications parameter is the quantity of repetition times used for sending the uplink signal by the terminal, the network device may learn, according to the uplink communications parameter, of a quantity of times that is of decoding the uplink signal sent by the terminal and that is required for successfully decoding the uplink signal. This avoids repeated decoding performed by the network device, and reduces processing overheads of the network device.

Optionally, when the uplink communications parameter is the channel bandwidth or the modulation and coding scheme that is used for sending the uplink signal by the terminal, the network device may clearly know specific channel bandwidth or a specific modulation and coding scheme that is used for decoding the uplink signal. This avoids blind detection performed by the network device (that is, when the network device does not know channel bandwidth or a modulation and coding scheme that is used for decoding, the network device performs decoding detection by using all channel bandwidth or modulation and coding schemes that are used by the terminal, that is, performs blind detection on the terminal), reduces processing overheads of the network device, and reduces decoding complexity of the network device.

According to the network device provided in this embodiment of the present invention, a receiving unit receives a quantity of repetition times, channel bandwidth, or a modulation and coding scheme that is used for sending an uplink signal by a terminal, so that a processing unit may accurately decode the uplink signal according to the quantity of repetition times, the channel bandwidth, or the modulation and coding scheme that is used for sending the uplink signal by the terminal, thereby reducing processing overheads and complexity when the network device performs decoding.

Figure 5:
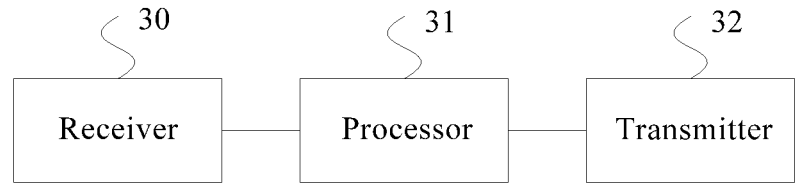
FIG. 5 is a schematic structural diagram of a second embodiment of a terminal according to the present invention.

FIG. 5 is a schematic structural diagram of a second embodiment of a terminal according to the present invention. As shown in FIG. 5, the terminal includes a receiver 30, a processor 31, and a transmitter 32.

The receiver 30 is configured to receive a downlink signal sent by a network device. The processor 31 is configured to determine a first coverage level of the terminal according to the downlink signal, and determine an uplink communications parameter according to the first coverage level. The transmitter 32 is configured to send an uplink signal to the network device according to the uplink communications parameter determined by the processor 31.

Specifically, the network device sends the downlink signal to the terminal. The downlink signal may be any signal delivered by the network device, for example, a broadcast signal, a common control signal, or a service signal. After receiving the downlink signal sent by the network device, the receiver 30 sends the downlink signal to the processor 31. The processor 31 determines the first coverage level of the terminal according to the downlink signal. Optionally, the processor 31 may determine the first coverage level of the terminal by measuring or decoding a downlink signal sent in a period of time.

It should be noted that, the first coverage level is used by the terminal to determine a value that needs to be increased in coverage performance relative to current coverage performance. For example, it is assumed that a coverage level of the terminal specifically includes three levels: a coverage level 0, a coverage level 1, and a coverage level 2, respectively. Coverage performance of the terminal corresponding to the coverage level 0 needs to be increased by 0 dB (that is, there is no need for enhancement), coverage performance of the terminal corresponding to the coverage level 1 needs to be increased by 0-10 dB, and coverage performance corresponding to the coverage level 2 needs to be increased by 10-20 dB. In consideration of complexity of coverage performance enhancement and system design, only a maximum value that needs to be increased in coverage performance is considered as a target of coverage performance enhancement of the terminal. That is, when determining that the first coverage level of the terminal is the coverage level 1, the processor 31 determines the uplink communications parameter according to the first coverage level, and the transmitter 32 sends the uplink signal to the network device according to the uplink communications parameter determined by the processor 31. Therefore, coverage performance of the terminal may be increased by 10 dB. The uplink communications parameter may be a quantity of repetition times of sending the uplink signal by the terminal to the network device, or may be transmit power for sending the uplink signal by the terminal to the network device, or may be channel bandwidth used when the terminal sends the uplink signal to the network device, or may be a modulation and coding scheme used when the terminal sends the uplink signal to the network device, or the like. The uplink communications parameter is not limited in this embodiment of the present invention, provided that the parameter is related to coverage performance. Optionally, according to the example exemplified above, when the processor 31 determines that the first coverage level of the terminal is the coverage level 1, the processor 31 may increase the coverage performance by 10 dB by using the determined uplink communications parameter.

In the prior art, coverage performance of a wireless network is generally enhanced by using an HARQ or ARQ retransmission mechanism, and the HARQ or the ARQ is a transmission mechanism based on a MAC layer and/or a transmission mechanism based on an RLC layer. The terminal needs an ACK/NACK response mechanism of the network device to cooperate in performing the HARQ or ARQ retransmission mechanism, to improve a probability of successful receiving performed by the terminal. In this method, air-interface interaction is frequent, signaling overheads are large, an execution period of coverage enhancement is relatively long, and power consumption of the terminal is large. Furthermore, because a quantity of retransmissions is generally not set to a large value in consideration of factors such as a resource, a delay, and complexity of a communication procedure, coverage enhancement amplitude of the wireless network is limited. In addition, the terminal cannot effectively adjust coverage enhancement in a timely manner according to a change of a coverage environment in which the terminal is located, and execution efficiency of coverage enhancement is low. However, in this application, the terminal determines the first coverage level of the terminal according to the downlink signal delivered by the network device, and determines, by using the first coverage level, the uplink communications parameter used when sending the uplink signal to the network device, that is, whether the terminal repeatedly sends the uplink signal to the network device, or the quantity of repetition times of sending the uplink signal is determined by the first coverage level of the terminal. The network device does not need to send an ACK/NACK feedback (that is, the terminal does not need to wait for an ACK feedback or a NACK feedback) to the terminal. Therefore, an execution period of coverage enhancement of the wireless network is relatively short, and power consumption of the terminal and signaling overheads are reduced. Furthermore, a flexible quantity of repetition times of sending leads to a relatively large increase in coverage performance of the wireless network. In addition, the terminal directly determines the coverage level of the terminal according to the downlink signal, and effectively adjusts the uplink communications parameter in a timely manner according to the coverage level, so that the terminal can effectively adjust coverage enhancement in a timely manner, thereby improving execution efficiency of coverage enhancement, and enhancing performance of uplink communication.

According to the terminal provided in this embodiment of the present invention, a receiver receives a downlink signal sent by a network device, a processor determines a first coverage level of the terminal according to the downlink signal, and determines an uplink communications parameter according to the first coverage level, and a transmitter sends an uplink signal to the network device according to the uplink communications parameter, so as to implement coverage enhancement of a wireless network. According to the terminal provided in this embodiment of the present invention, a probability of successfully receiving the uplink signal is improved. Therefore, the network device does not need to send an ACK feedback or a NACK feedback to the terminal, so that overheads of an air interface between the terminal and the network device are reduced, a period in which the terminal performs coverage enhancement is shortened, and power consumption of the terminal is reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

Further, the downlink signal may include at least one of: a first signal transmitted on a downlink synchronization channel (SCH), a second signal transmitted on a common transport channel (CCH), a third signal transmitted on a broadcast control channel (BCCH), a repeatedly-sent sequence signal used for downlink synchronization, a reference signal used for cell channel measurement, or a signal transmitted on a BCCH carrier.

Optionally, the repeatedly-sent sequence signal used for downlink synchronization may be a primary synchronization signal (PSS), or may be a secondary synchronization signal (SSS). The reference signal used for cell channel measurement may be a cell-specific reference signal (CRS).

Optionally, when the downlink signal includes multiple signals of the first signal, the second signal, the third signal, the repeatedly-sent sequence signal used for downlink synchronization, the reference signal used for cell channel measurement, and the signal transmitted on the BCCH carrier, the terminal may determine one first coverage level according to each downlink signal, and then correspondingly analyze or calculate multiple first coverage levels to obtain the most accurate first coverage level of the terminal. It should be noted that, herein, corresponding analysis or calculation of the multiple first coverage levels may be any calculation such as weighted averaging, arithmetic averaging, or function mapping, provided that an accurate first coverage level can be obtained.

On the basis of the foregoing embodiment shown in FIG. 5, in a first possible implementation manner of this embodiment, this embodiment involves a specific process in which the terminal performs coverage enhancement when the downlink signal is any one of the first signal, the second signal, or the third signal. On the basis of the foregoing embodiment, the processor 31 is specifically configured to: when the downlink signal is successfully decoded, determine the first coverage level of the terminal according to a first preset relationship and a quantity of times of receiving the downlink signal by the receiver 30, where the first preset relationship includes a mapping relationship between the first coverage level and the quantity of times of receiving the downlink signal when the terminal successfully decodes the downlink signal.

Specifically, if the downlink signal is the first signal transmitted on the SCH, when receiving the first signal for the first time, the receiver 30 sends the first signal to the processor 31. The processor 31 decodes the first signal, and if decoding is successful, determines that a quantity of repetition times of the first signal is 1; if decoding is unsuccessful, performs soft combination on a next first signal and the previous first signal that fails to be decoded, performs decoding again, and so on, until the first signal is successfully decoded. A quantity of times of receiving the first signal by the time the first signal is successfully decoded is determined.

The processor 31 matches the determined quantity of repetition times of the first signal with the first preset relationship, so as to determine the first coverage level of the terminal. The first preset relationship may include multiple preset threshold ranges, and each preset threshold range corresponds to one coverage level. Optionally, the first preset relationship may be in a form of a mapping table. For details, reference may be made to the example shown in the foregoing Table 1, and details are not described herein again. After determining the first coverage level of the terminal, the processor 31 determines, according to the first coverage level, the uplink communications parameter used when sending the uplink signal to the network device.

According to the terminal provided in this embodiment of the present invention, a receiver receives a downlink signal sent by a network device, and a processor determines a first coverage level of the terminal according to a first preset relationship and a quantity of times of receiving the downlink signal by the receiver when decoding is successful, and determines, according to the first coverage level, an uplink communications parameter used when the terminal sends an uplink signal to the network device, so that a transmitter sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 5, in a second possible implementation manner of this embodiment, this embodiment involves a specific process in which the terminal performs coverage enhancement when the downlink signal is the repeatedly-sent sequence signal used for downlink synchronization. The repeatedly-sent sequence signal used for downlink synchronization (for example, a PSS or an SSS) has a characteristic of self-repetition. The solution in this embodiment is applicable to a new air interface scenario. On the basis of the foregoing embodiment shown in FIG. 5, the processor 31 is specifically configured to: perform, at a moment of receiving the downlink signal, energy accumulation on all downlink signals received by the receiver 30; correlate a signal obtained after energy accumulation and a preset reference signal of the downlink signal, to obtain a correlation value of the downlink signal; and when the correlation value of the downlink signal exceeds a preset threshold, determine the first coverage level of the terminal according to a second preset relationship and a quantity of times of receiving the downlink signal by the receiver 30, where the second preset relationship includes a mapping relationship between the first coverage level and the quantity of times of receiving the downlink signal by the terminal when the correlation value of the downlink signal exceeds the preset threshold.

Specifically, that the downlink signal is a PSS is used as an example (for a case in which the downlink signal is an SSS, reference may be made to the following execution process). When receiving the PSS for the first time, the receiver 30 sends the PSS to the processor 31. The processor 31 correlates the PSS and a reference signal that is of the PSS and that is preset inside the terminal (the PSS that is sent by the network device and is received by the terminal is a PSS that passes through a wireless channel, and the PSS has been actually affected by a factor such as channel attenuation or interference and is not an ideal PSS that is originally sent by the network device to the terminal, but the reference signal that is of the PSS and that is preset inside the terminal is the ideal PSS that does not pass through the wireless channel), to obtain a correlation value of the PSS, and determines whether the correlation value of the PSS exceeds the preset threshold. When the preset threshold is exceeded, the processor 31 determines that a quantity of repetition times of the PSS is 1. When the threshold is not exceeded, the processor 31 performs energy accumulation on a next received PSS and the previous PSS, calculates a correlation value of a PSS obtained after accumulation (that is, the PSS obtained after accumulation and the reference signal that is of the PSS and that is preset inside the terminal are correlated), determines whether the correlation value exceeds the preset threshold, and so on, until the processor 31 determines that the correlation value of the PSS exceeds the preset threshold. A quantity of times of receiving the PSS by the time the correlation value of the PSS is greater than the preset threshold is determined.

The processor 31 matches the second preset relationship with the quantity of times of receiving the PSS by the receiver 30 when the determined correlation value of the PSS is greater than the preset threshold, so as to determine the first coverage level of the terminal. The second preset relationship may include multiple preset threshold ranges, and each preset threshold range corresponds to one coverage level. Optionally, the second preset relationship may be in a form of a mapping table. For details, reference may be made to the example shown in the foregoing Table 2, and details are not described herein again. After determining the first coverage level of the terminal, the processor 31 determines, according to the first coverage level, the uplink communications parameter used when sending the uplink signal to the network device.

According to the terminal provided in this embodiment of the present invention, a receiver receives a downlink signal sent by a network device, and a processor determines a first coverage level of the terminal according to a second preset relationship and a quantity of times of receiving the downlink signal by the receiver when a correlation value of the downlink signal exceeds a preset threshold, and determines, according to the first coverage level, an uplink communications parameter used when the terminal sends an uplink signal to the network device, so that a transmitter sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 5, in a third possible implementation manner of this embodiment, this embodiment involves a specific process in which the terminal performs coverage enhancement when the downlink signal is the signal transmitted on the BCCH carrier. On the basis of the foregoing embodiment shown in FIG. 1, the processor 31 is specifically configured to: measure received signal strength of the downlink signal received by the receiver 30 in a preset period of time, determine first received signal strength according to the received signal strength that is of the downlink signal and is measured in the preset period of time, and determine the first coverage level of the terminal according to the first received signal strength and a third preset relationship, where the third preset relationship includes a mapping relationship between the first received signal strength and the first coverage level.

Specifically, the network device sends, to the terminal in the preset period of time, the signal transmitted on the BCCH carrier, that is, the signal is carried on a BCCH and is sent to the terminal. The receiver 30 transmits, to the processor 31, the received signal transmitted on the BCCH carrier. The processor 31 measures received signal strength of the signal transmitted on the BCCH carrier, and obtains first received signal strength by means of calculation according to the received signal strength of the signal transmitted on the BCCH carrier. Optionally, the first received signal strength may be average received signal strength of signals transmitted on the BCCH carrier, or may be received signal strength obtained by means of any calculation performed by the processor 31 on received signal strength of all signals transmitted on the BCCH carrier in the preset period of time.

The processor 31 matches the determined first received signal strength with the third preset relationship, so as to determine the first coverage level of the terminal. The third preset relationship may include multiple preset threshold ranges, and each preset threshold range corresponds to one coverage level. Optionally, the third preset relationship may be in a form of a mapping table. For details, reference may be made to the example shown in the foregoing Table 3, and details are not described herein again. After determining the first coverage level of the terminal, the processor 31 determines, according to the first coverage level, the uplink communications parameter used when sending the uplink signal to the network device.

According to the terminal provided in this embodiment of the present invention, a receiver receives a downlink signal sent by a network device, and a processor measures received signal strength of each downlink signal received in a preset period of time, to obtain first received signal strength of these downlink signals, and determines a first coverage level of the terminal according to the first received signal strength and a third preset relationship, so as to determine, according to the first coverage level, an uplink communications parameter used when the terminal sends an uplink signal to the network device. Therefore, a transmitter sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of the foregoing embodiment shown in FIG. 5, in a fourth possible implementation manner of this embodiment, this embodiment involves a specific process in which the terminal performs coverage enhancement when the downlink signal is the reference signal used for cell channel measurement. On the basis of the foregoing embodiment shown in FIG. 1, the processor 31 is specifically configured to: measure a path loss between the terminal and the network device according to the downlink signal received by the receiver 30 in a preset period of time, determine a first path loss between the terminal and the network device according to all path losses measured in the preset period of time, and determine the first coverage level of the terminal according to the first path loss and a fourth preset relationship, where the fourth preset relationship includes a mapping relationship between the first path loss and the first coverage level.

Specifically, the CRS is used as an example. The network device repeatedly sends the CRS to the terminal in the preset period of time. The receiver 30 sends each received CRS to the processor 31. The processor 31 measures the path loss (one CRS corresponds to one path loss) between the terminal and the network device according to each CRS received by the receiver 30 in the preset period of time, and obtains the first path loss between the terminal and the network device by means of calculation according to these path losses. Optionally, the first path loss may be an average path loss between the terminal and the network device, or may be a path loss obtained by means of any calculation performed by the processor 31 on all the path losses between the terminal and the network device in the preset period of time.

The processor 31 matches the determined first path loss with the fourth preset relationship, so as to determine the first coverage level of the terminal. The fourth preset relationship may include multiple preset threshold ranges, and each preset threshold range corresponds to a different coverage level. Optionally, the fourth preset relationship may be in a form of a mapping table. For details, reference may be made to the foregoing Table 4, and details are not described herein again. After determining the first coverage level of the terminal, the processor 31 determines, according to the first coverage level, the uplink communications parameter used when sending the uplink signal to the network device.

According to the terminal provided in this embodiment of the present invention, a receiver receives a downlink signal sent by a network device, and a processor measures a path loss between the terminal and the network device according to each CRS received by the receiver in a preset period of time, to obtain a first path loss between the terminal and the terminal device, and determines a first coverage level of the terminal according to the first path loss and a fourth preset relationship, so as to determine, according to the first coverage level, an uplink communications parameter used when the terminal sends an uplink signal to the network device. Therefore, a transmitter sends the uplink signal to the network device according to the uplink communications parameter, so as to implement coverage enhancement of a wireless network. When performing coverage enhancement of the wireless network, the terminal provided in this embodiment of the present invention sends the uplink signal to the network device by using the uplink communications parameter that is determined according to the coverage level of the terminal. This avoids a redundant quantity of repetition times caused by blindly increasing a quantity of retransmissions by the terminal to enhance coverage performance of the wireless network, and reduces power consumption of the terminal. In addition, the network device does not need to send an ACK feedback or a NACK feedback to the terminal, and overheads of an air interface between the terminal and the network device are reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

On the basis of any one of the foregoing possible implementation manners, in a fifth possible implementation manner of this embodiment of the present invention, this embodiment involves a specific process in which the terminal sends the determined first coverage level to the network device, so that the network device performs proper resource scheduling on the terminal. The transmitter 32 is further configured to send the first coverage level to the network device.

Specifically, after determining the first coverage level of the terminal according to the downlink signal, the processor 31 sends the first coverage level to the network device by using the transmitter 32. Optionally, the first coverage level may be sent to the network device directly in an explicit manner (directly in a manner of a message information element), or the first coverage level may be carried in a physical signal and be sent to the network device in an implicit manner. Optionally, in the explicit sending manner, the first coverage level may be sent to the network device by using a channel request message sent on a RACH. In the implicit sending manner, the terminal may carry information about the first coverage level by using a quantity of repetition times of sending the uplink signal or other physical layer processing (for example, manners such as symbol rotation, a signal cyclic shift, adding or scrambling of a special sequence).

After receiving the first coverage level, the network device performs proper resource scheduling on uplink and downlink resources of the terminal.

According to the terminal provided in this embodiment of the present invention, after determining a first coverage level of the terminal according to a downlink signal, a processor sends the first coverage level to a network device by using a transmitter, so that scheduling of uplink and downlink resources of the terminal by the network device is more accurate, and resource utilization is improved.

On the basis of any one of the foregoing possible implementation manners, in a sixth possible implementation manner of this embodiment of the present invention, this embodiment involves a specific process in which the terminal updates the coverage level. Further, the processor 31 is further configured to establish a service connection to the network device. The receiver 30 is further configured to receive a service signal repeatedly sent by the network device, where a quantity of repetition times of the service signal is determined by the network device according to the first coverage level of the terminal. The processor 31 is further configured to determine a second coverage level of the terminal according to a fifth preset relationship and the quantity of times of receiving the service signal when the service signal is successfully decoded, where the fifth preset relationship includes a mapping relationship between the second coverage level and the quantity of times of receiving the service signal when the terminal successfully decodes the service signal.

Specifically, in any one of the foregoing embodiments, the terminal performs service signal communication with the network device only after determining the first coverage level of the terminal. The service signal may be a downlink data signal.

The receiver 30 receives the service signal repeatedly sent by the network device. The quantity of repetition times of the service signal is determined by the network device according to the first coverage level that is of the terminal and that is reported by the transmitter 32. It is assumed that the quantity is n, that is, the first coverage level of the terminal determines that the terminal can perform successful decoding only after the service signal is repeated for n times. Therefore, a quantity of times of sending the service signal by the network device is n. The receiver 30 sends all received service signals to the processor 31. The processor 31 decodes the service signal. When decoding is successful, the processor records the quantity of times of receiving the service signal by the time decoding is successful. It is assumed that the quantity is m (m is less than n), that is, in this case, the terminal can successfully decode the service signal after the service signal is repeated for only m times. Therefore, the processor 31 matches the fifth preset relationship with the quantity (that is, m) of times of receiving the service signal when decoding is successful, and determines the second coverage level of the terminal, so as to update the original first coverage level of the terminal to the second coverage level. Optionally, the terminal may send the second coverage level to the network device by using the transmitter 32, so that the network device allocates a proper resource to the terminal according to the second coverage level, thereby avoiding resource waste caused by redundant sending. Optionally, the terminal may adjust, in a timely manner according to the second coverage level, an uplink communications parameter used when performing service communication with the network device, such as a quantity of repetition times, channel bandwidth, transmit power, or a modulation and coding scheme.

According to the terminal provided in this embodiment of the present invention, a receiver receives a service signal repeatedly sent by a network device. A quantity of repetition times of the service signal is determined by the network device according to a first coverage level of the terminal. A processor determines a second coverage level of the terminal according to a fifth preset relationship and a quantity of times of receiving the service signal when decoding is successful. According to the terminal provided in this embodiment of the present invention, the coverage level of the terminal is updated in a timely manner, and an uplink communications parameter is effectively adjusted in a timely manner according to the updated coverage level, so that the terminal can effectively adjust coverage enhancement in a timely manner, thereby improving execution efficiency of coverage enhancement, and enhancing performance of uplink communication.

Optionally, on the basis of any one of the foregoing embodiments, the uplink communications parameter that is determined by the terminal according to the first coverage level of the terminal may be at least one of: the quantity of repetition times, the channel bandwidth, the transmit power, or the modulation and coding scheme that is used when the terminal sends the uplink signal.

It should be noted that, because the terminal may use multiple types of channel bandwidth to communicate with the network device, herein, the processor 31 determines, according to the first coverage level, the channel bandwidth used when the terminal sends the uplink signal to the network device, so that the transmitter 32 may send the uplink signal to the network device for a preset quantity of repetition times by using the determined channel bandwidth. There is a correspondence between the preset quantity of repetition times and the determined channel bandwidth that is used for sending the uplink signal by the terminal. For example, narrower channel bandwidth that is used for sending the uplink signal by the transmitter 32 leads to more concentrated energy of the uplink signal sent by the transmitter 32, and therefore leads to a smaller preset quantity of repetition times. Therefore, the terminal can send the uplink signal to the network device for a relatively appropriate quantity of repetition times, and signaling overheads of the terminal are reduced.

In another aspect, the processor 31 may determine, according to the determined first coverage level, the channel bandwidth and the quantity of repetition times that are used when the terminal sends the uplink signal to the network device. That is, the processor 31 simultaneously determines, according to the first coverage level, the channel bandwidth and the quantity of repetition times that are suitable for the terminal to send the uplink signal. The channel bandwidth and the quantity of repetition times that are determined herein are comprehensively considered by the processor 31 according to the first coverage level, the quantity of repetition times, and the channel bandwidth. For example, the processor 31 may determine a quantity A of repetition times according to the first coverage level, or may determine channel bandwidth B according to the first coverage level. Furthermore, the processor 31 may perform fine adjustment on the determined quantity A of repetition times and the determined channel bandwidth B according to an actual wireless environment (for example, fast or slow fading of a channel and channel noise) in a wireless network, to select proper channel bandwidth a and a proper quantity b of repetition times, and send the uplink signal on the channel bandwidth a for the quantity b of repetition times. In this method, the terminal does not need to send the uplink signal repeatedly for many times to the network device, and signaling overheads of the terminal are reduced.

In another aspect, the terminal in this embodiment of the present invention may use multiple modulation and coding schemes when communicating with the network device. The processor 31 determines, according to the first coverage level, the modulation and coding scheme used when the terminal sends the uplink signal to the network device. For example, a higher first coverage level determined by the terminal indicates that a wireless channel environment in which the terminal is currently located is relatively poor, and current coverage performance needs to be increased in relatively large amplitude. Therefore, the terminal uses a lower-order modulation manner and a coding manner with relatively high redundancy, so as to avoid redundant sending caused by using an inappropriate modulation and coding scheme by the terminal, and reduce signaling overheads of the terminal.

According to the terminal provided in this embodiment, when performing uplink communication, the terminal may use an uplink communications parameter that is suitable for the terminal to send an uplink signal, thereby reducing signaling overheads of the terminal.

Figure 6:
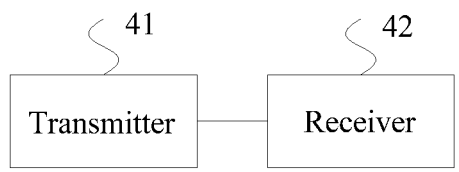
FIG. 6 is a schematic structural diagram of a third embodiment of a network device according to the present invention.

FIG. 6 is a schematic structural diagram of a third embodiment of a network device according to the present invention. As shown in FIG. 6, the network device includes a transmitter 41 and a receiver 42. The transmitter 41 is configured to send a downlink signal to a terminal. The receiver 42 is configured to receive an uplink signal that is sent by the terminal according to an uplink communications parameter determined by the terminal, where the uplink communications parameter is determined by the terminal according to a first coverage level, and the first coverage level is determined by the terminal according to the downlink signal.

Specifically, the transmitter 41 sends the downlink signal to the terminal. The downlink signal may be any signal delivered by the network device, for example, a broadcast signal, a common control signal, or a service signal. After receiving the downlink signal sent by the network device, the terminal determines the first coverage level of the terminal according to the downlink signal. Optionally, the terminal may determine the first coverage level of the terminal by measuring or decoding a downlink signal repeatedly sent in a period of time.

The first coverage level may correspond to a value that needs to be increased in coverage performance. For example, it is assumed that a coverage level of the terminal may specifically include three levels: a coverage level 0, a coverage level 1, and a coverage level 2, respectively. Coverage performance corresponding to the coverage level 0 needs to be increased by 0 dB (that is, there is no need for enhancement), coverage performance corresponding to the coverage level 1 needs to be increased by 0-10 dB, and coverage performance corresponding to the coverage level 2 needs to be increased by 10-20 dB. In consideration of complexity of coverage performance enhancement and system design, only a maximum value that needs to be increased in coverage performance is considered as a target of coverage performance enhancement of the terminal. That is, when determining that the first coverage level of the terminal is the coverage level 1, the terminal may determine the uplink communications parameter according to the first coverage level to perform configuration, so that the receiver 42 may receive the uplink signal that is sent by the terminal according to the uplink communications parameter. Therefore, coverage performance may be increased by 10 dB. The uplink communications parameter may be a quantity of repetition times of sending the uplink signal by the terminal to the network device, or may be power for sending the uplink signal by the terminal to the network device, or may be channel bandwidth used when the terminal sends the uplink signal to the network device, or may be a modulation and coding scheme used when the terminal sends the uplink signal to the network device, or the like. The uplink communications parameter is not limited in this embodiment of the present invention, provided that the parameter is related to coverage performance. Optionally, according to the example exemplified above, when determining that the first coverage level of the terminal is the coverage level 1, the terminal may increase the coverage performance by 10 dB.

In the prior art, coverage performance of a wireless network is generally enhanced by using an HARQ or ARQ retransmission mechanism, and the HARQ or the ARQ is a transmission mechanism based on a MAC layer and/or a transmission mechanism based on an RLC layer. The terminal needs an ACK/NACK response mechanism of the network device to cooperate in performing the HARQ or ARQ retransmission mechanism, to improve a probability of successful receiving performed by the terminal. In this method, air-interface interaction is frequent, signaling overheads are large, an execution period of coverage enhancement is relatively long, and power consumption of the terminal is large. Furthermore, because a quantity of retransmissions is generally not set to a large value in consideration of factors such as a resource, a delay, and complexity of a communication procedure, coverage enhancement amplitude of the wireless network is limited. In addition, the terminal cannot effectively adjust coverage enhancement in a timely manner according to a change of a coverage environment in which the terminal is located, and execution efficiency of coverage enhancement is low. However, in this application, the terminal determines the first coverage level of the terminal according to the downlink signal delivered by the network device, and determines, by using the first coverage level, the uplink communications parameter used when sending the uplink signal to the network device, that is, whether the terminal repeatedly sends the uplink signal to the network device, or the quantity of repetition times of sending the uplink signal is determined by the first coverage level of the terminal. The network device does not need to send an ACK/NACK feedback (that is, the terminal does not need to wait for an ACK feedback or a NACK feedback) to the terminal. Therefore, an execution period of coverage enhancement of the wireless network is relatively short, and power consumption of the terminal and signaling overheads are reduced. Furthermore, a flexible quantity of repetition times of sending leads to a relatively large increase in coverage performance of the wireless network. In addition, the terminal directly determines the coverage level of the terminal according to the downlink signal, and effectively adjusts the uplink communications parameter in a timely manner according to the coverage level, so that the terminal can effectively adjust coverage enhancement in a timely manner, thereby improving execution efficiency of coverage enhancement, and enhancing performance of uplink communication.

According to the network device provided in this embodiment of the present invention, a transmitter sends a downlink signal to a terminal, so that the terminal determines a first coverage level of the terminal according to the downlink signal, and determines an uplink communications parameter according to the first coverage level. Therefore, a receiver may receive an uplink signal that is sent by the terminal according to the determined uplink communications parameter, so as to implement coverage enhancement of a wireless network. According to the network device provided in this embodiment of the present invention, a probability of successfully receiving the uplink signal is improved. Therefore, the network device does not need to send an ACK feedback or a NACK feedback to the terminal, so that overheads of an air interface between the terminal and the network device are reduced, a period in which the terminal performs coverage enhancement is shortened, and power consumption of the terminal is reduced. In addition, by using the terminal provided in this embodiment of the present invention, the coverage level of the terminal is directly determined according to the downlink signal, and the uplink communications parameter is effectively adjusted in a timely manner according to the coverage level, so that the terminal can effectively adjust coverage enhancement in a timely manner, thereby improving execution efficiency of coverage enhancement, and enhancing performance of uplink communication.

Further, the downlink signal includes one of a first signal transmitted on an SCH, a second signal transmitted on a CCH, a third signal transmitted on a BCCH, a repeatedly-sent sequence signal used for downlink synchronization, a reference signal used for cell channel measurement, or a signal transmitted on a BCCH carrier.

Optionally, the repeatedly-sent sequence signal used for downlink synchronization may be a PSS, or may be an SSS. The reference signal used for cell channel measurement may be a CRS.

Further, the uplink communications parameter may be a quantity of repetition times, channel bandwidth, transmit power, or a modulation and coding scheme that is used for sending the uplink signal by the terminal.

It should be noted that, because the terminal may use multiple types of channel bandwidth to communicate with the network device, herein, the terminal determines, according to the first coverage level, the channel bandwidth used when the terminal sends the uplink signal to the network device, so that the terminal may send the uplink signal to the network device for a preset quantity of repetition times by using the determined channel bandwidth. There is a correspondence between the preset quantity of repetition times and the determined channel bandwidth that is used for sending the uplink signal by the terminal. For example, narrower channel bandwidth that is used for sending the uplink signal by the terminal leads to more concentrated energy of the uplink signal sent by the terminal, and therefore leads to a smaller preset quantity of repetition times. Therefore, the terminal can send the uplink signal to the network device for a relatively appropriate quantity of repetition times, and signaling overheads of the terminal are reduced.

In another aspect, the terminal may determine, according to the determined first coverage level, the channel bandwidth and the quantity of repetition times that are used when the terminal sends the uplink signal to the network device. That is, the terminal simultaneously determines, according to the first coverage level, the channel bandwidth and the quantity of repetition times that are suitable for the terminal to send the uplink signal. The channel bandwidth and the quantity of repetition times that are determined herein are comprehensively considered by the terminal according to the first coverage level, the quantity of repetition times, and the channel bandwidth. For example, the terminal may determine a quantity A of repetition times according to the first coverage level, or may determine channel bandwidth B according to the first coverage level. Furthermore, the terminal may perform fine adjustment on the determined quantity A of repetition times and the determined channel bandwidth B according to an actual wireless environment (for example, fast or slow fading of a channel and channel noise) in a wireless network, to select proper channel bandwidth a and a proper quantity b of repetition times, and send the uplink signal on the channel bandwidth a for the quantity b of repetition times. In this method, the terminal does not need to send the uplink signal repeatedly for many times to the network device, and signaling overheads of the terminal are reduced.

In another aspect, the terminal in this embodiment of the present invention may use multiple modulation and coding schemes when communicating with the network device. The terminal determines, according to the first coverage level, the modulation and coding scheme used when the terminal sends the uplink signal to the network device. For example, a higher first coverage level determined by the terminal indicates that a wireless channel environment in which the terminal is currently located is relatively poor, and current coverage performance needs to be increased in relatively large amplitude. Therefore, the terminal uses a lower-order modulation manner and a coding manner with relatively high redundancy, so as to avoid redundant sending caused by using an inappropriate modulation and coding scheme by the terminal, and reduce signaling overheads of the terminal.

According to the network device provided in this embodiment, a terminal may determine a first coverage level according to a downlink signal delivered by the network device, and determine, according to the first coverage level, an uplink communications parameter that is suitable for the terminal to send an uplink signal and that may be used by the terminal when performing uplink communication, thereby reducing signaling overheads of the terminal.

Figure 7:
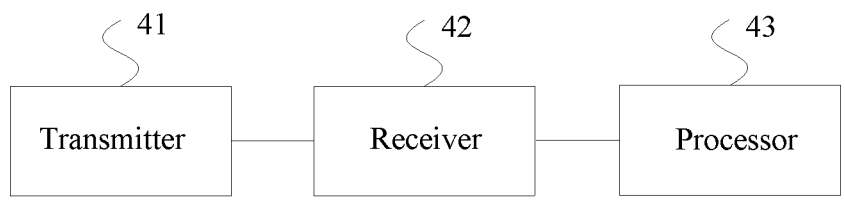
FIG. 7 is a schematic structural diagram of a fourth embodiment of a network device according to the present invention.

FIG. 7 is a schematic structural diagram of a fourth embodiment of a network device according to the present invention. On the basis of the foregoing embodiment, this embodiment involves a specific process in which the network device receives the first coverage level sent by the terminal, and performs resource scheduling on the terminal according to the first coverage level. Further, the network device may further include a processor 43. The receiver 42 is further configured to receive the first coverage level sent by the terminal. The processor 43 is configured to perform resource scheduling on the terminal according to the first coverage level after the receiver 42 receives the first coverage level sent by the terminal.

Specifically, after determining the first coverage level of the terminal, the terminal sends the first coverage level to the network device, and the receiver 42 receives the first coverage level, so that the processor 43 may calculate an uplink or downlink resource according to the first coverage level, and perform proper resource scheduling on the terminal. Optionally, the network device may send scheduling information to the terminal. The scheduling information may include a size of the uplink or downlink resource, so that the terminal learns of a size of a time-frequency resource that should be used when performing uplink communication. Optionally, the terminal may send the first coverage level to the network device directly in an explicit manner (directly in a manner of a message information element), or the first coverage level may be carried in a physical signal characteristic and be sent to the network device in an implicit manner. Optionally, in the explicit sending manner, the first coverage level may be sent to the network device by using a channel request message sent on a RACH. In the implicit sending manner, the terminal may carry information about the first coverage level by using a quantity of repetition times of uplink sending or other physical layer processing (for example, manners such as symbol rotation, a signal cyclic shift, adding or scrambling of a special sequence).

According to the network device provided in this embodiment of the present invention, a receiver receives a first coverage level sent by a terminal, and a processor performs resource scheduling on the terminal according to the first coverage level, so that scheduling of uplink and downlink resources of the terminal by the network device is more accurate, and resource utilization is improved.

Continuing to refer to FIG. 7, on the basis of the foregoing embodiment, this embodiment involves a specific process in which the network device establishes a service connection to the terminal, and sends a service signal to the terminal, so that the terminal updates the coverage level of the terminal in a timely manner. Further, the processor 43 is further configured to establish a service connection to the terminal after the receiver 42 receives the first coverage level sent by the terminal. The transmitter 41 is further configured to repeatedly send a service signal to the terminal according to the first coverage level, so that the terminal determines a second coverage level of the terminal according to the repeatedly-sent service signal.

Specifically, in any one of foregoing embodiments, the processor 43 establishes service communication with the terminal only after the receiver 42 receives the first coverage level sent by the terminal.

The transmitter 41 repeatedly sends the service signal to the terminal according to the first coverage level received by the receiver 42. The service signal may be a downlink data signal, a downlink voice signal, a downlink video signal, or the like. A quantity of repetition times of the service signal is determined by the processor 43 according to the first coverage level reported by the terminal. It is assumed that the quantity is n, that is, the first coverage level of the terminal determines that the terminal can perform successful decoding only after the network device delivers the service signal for n times. Therefore, the processor 43 determines, according to the first coverage level received by the receiver 42, that the quantity of times of sending the service signal is n. The terminal decodes the service signal. When decoding is successful, the terminal determines the quantity of times of receiving the service signal by the time decoding is successful. It is assumed that the quantity is m (m is less than n), that is, in this case, the terminal can successfully decode the service signal after the network device delivers the service signal for only m times. Therefore, the terminal matches the fifth preset relationship with the quantity (that is, m) of times of receiving the service signal when decoding is successful, and determines the second coverage level of the terminal, so as to update the original first coverage level of the terminal to the second coverage level. Optionally, the terminal may send the second coverage level to the network device, so that the network device allocates a proper resource to the terminal according to the second coverage level, thereby avoiding resource waste caused by redundant sending. Optionally, the terminal may adjust, in a timely manner according to the second coverage level, an uplink communications parameter used when performing service communication with the network device, such as a quantity of repetition times, channel bandwidth, transmit power, or a modulation and coding scheme.

According to the network device provided in this embodiment of the present invention, a processor establishes service communication with a terminal after a receiver receives a first coverage level sent by the terminal, and a transmitter repeatedly sends a service signal to the terminal according to the first coverage level, so that the terminal determines a second coverage level of the terminal according to the repeatedly-sent service signal. According to the network device provided in this embodiment of the present invention, the coverage level of the terminal is updated in a timely manner, and an uplink communications parameter is effectively adjusted in a timely manner according to the updated coverage level, so that the terminal can effectively adjust coverage enhancement in a timely manner, thereby improving execution efficiency of coverage enhancement, and enhancing performance of uplink communication.

Further, on the basis of the foregoing embodiment shown in FIG. 7, when the uplink communications parameter includes the quantity of repetition times, the channel bandwidth, or the modulation and coding scheme that is used for sending the uplink signal by the terminal, the receiver 42 is further configured to receive the uplink communications parameter sent by the terminal, and the processor 43 is further configured to decode the uplink signal according to the uplink communications parameter.

Optionally, when the uplink communications parameter is the quantity of repetition times used for sending the uplink signal by the terminal, the network device may learn, according to the uplink communications parameter, of a quantity of times that is of decoding the uplink signal sent by the terminal and that is required for successfully decoding the uplink signal. This avoids repeated decoding performed by the network device, and reduces processing overheads of the network device.

Optionally, when the uplink communications parameter is the channel bandwidth or the modulation and coding scheme that is used for sending the uplink signal by the terminal, the network device may clearly know specific channel bandwidth or a specific modulation and coding scheme that is used for decoding the uplink signal. This avoids blind detection performed by the network device (that is, when the network device does not know channel bandwidth or a modulation and coding scheme that is used for decoding, the network device performs decoding detection by using all channel bandwidth or modulation and coding schemes that are used by the terminal, that is, performs blind detection on the terminal), reduces processing overheads of the network device, and reduces decoding complexity of the network device.

According to the network device provided in this embodiment of the present invention, a receiver receives a quantity of repetition times, channel bandwidth, or a modulation and coding scheme that is used for sending an uplink signal by a terminal, so that a processor may accurately decode the uplink signal according to the quantity of repetition times, the channel bandwidth, or the modulation and coding scheme that is used for sending the uplink signal by the terminal, thereby reducing processing overheads and complexity when the network device performs decoding.

Figure 8:
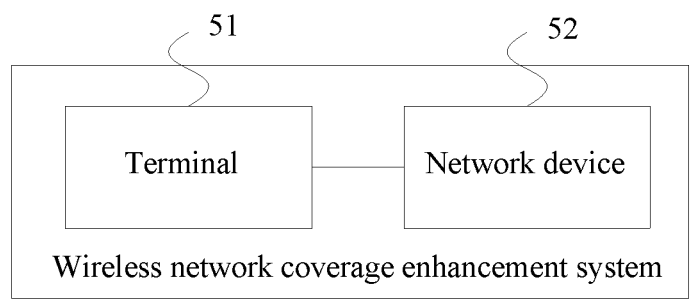
FIG. 8 is a schematic structural diagram of an embodiment of a wireless network coverage enhancement system according to the present invention.

FIG. 8 is a schematic structural diagram of an embodiment of a wireless network coverage enhancement system according to the present invention. As shown in FIG. 8, the system includes a terminal 51 shown in the foregoing embodiments and a network device 52 shown in the foregoing embodiments. Implementation principles and technical effects of the system, the terminal, and the network device are similar, and details are not described herein again.

Figure 9:
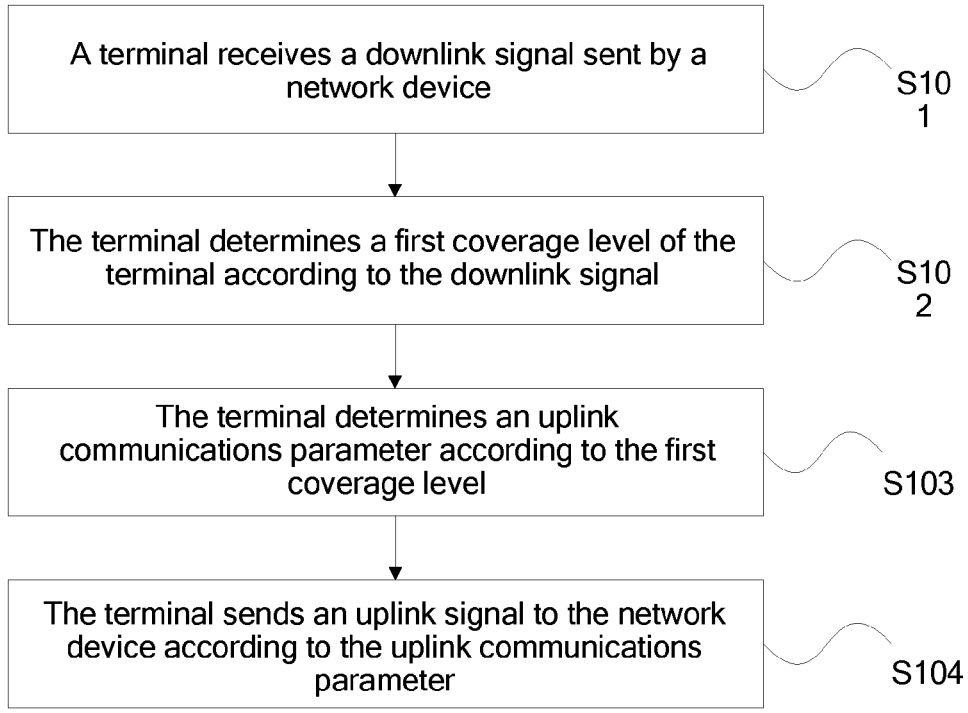
FIG. 9 is a schematic flowchart of a first embodiment of a wireless network coverage enhancement method according to the present invention.

FIG. 9 is a schematic flowchart of a first embodiment of a wireless network coverage enhancement method according to the present invention. As shown in FIG. 9, the method includes the following steps:

S101: A terminal receives a downlink signal sent by a network device.

S102: The terminal determines a first coverage level of the terminal according to the downlink signal.

S103: The terminal determines an uplink communications parameter according to the first coverage level.

S104: The terminal sends an uplink signal to the network device according to the uplink communications parameter.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Further, the uplink communications parameter includes at least one of the following: a quantity of repetition times, channel bandwidth, transmit power, or a modulation and coding scheme that is used for sending the uplink signal.

The downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

Optionally, when the downlink signal is any one of the first signal, the second signal, or the third signal, S102 may be specifically: when the downlink signal is successfully decoded, determining, by the terminal, the first coverage level of the terminal according to a first preset relationship and a quantity of times of receiving the downlink signal, where the first preset relationship includes a mapping relationship between the first coverage level and the quantity of times of receiving the downlink signal when the terminal successfully decodes the downlink signal.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Optionally, when the downlink signal is the repeatedly-sent sequence signal used for downlink synchronization, S102 may be specifically: performing, by the terminal at a moment of receiving the downlink signal, energy accumulation on all the received downlink signals; correlating, by the terminal, a signal obtained after energy accumulation and a preset reference signal of the downlink signal, to obtain a correlation value of the downlink signal; and when the correlation value of the downlink signal exceeds a preset threshold, determining, by the terminal, the first coverage level of the terminal according to a second preset relationship and a quantity of times of receiving the downlink signal, where the second preset relationship includes a mapping relationship between the first coverage level and the quantity of times of receiving the downlink signal by the terminal when the correlation value of the downlink signal exceeds the preset threshold.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Optionally, when the downlink signal is the signal transmitted on the BCCH carrier, S102 may be specifically: measuring, by the terminal, received signal strength of the downlink signal received in a preset period of time; determining, by the terminal, first received signal strength according to the received signal strength that is of the downlink signal and is measured in the preset period of time; and determining, by the terminal, the first coverage level of the terminal according to the first received signal strength and a third preset relationship, where the third preset relationship includes a mapping relationship between the first received signal strength and the first coverage level.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Optionally, when the downlink signal is the reference signal used for cell channel measurement, S102 may be specifically: measuring, by the terminal, a path loss between the terminal and the network device according to the downlink signal received in a preset period of time; determining, by the terminal, a first path loss between the terminal and the network device according to all path losses measured in the preset period of time; and determining, by the terminal, the first coverage level of the terminal according to the first path loss and a fourth preset relationship, where the fourth preset relationship includes a mapping relationship between the first path loss and the first coverage level.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Figure 10:
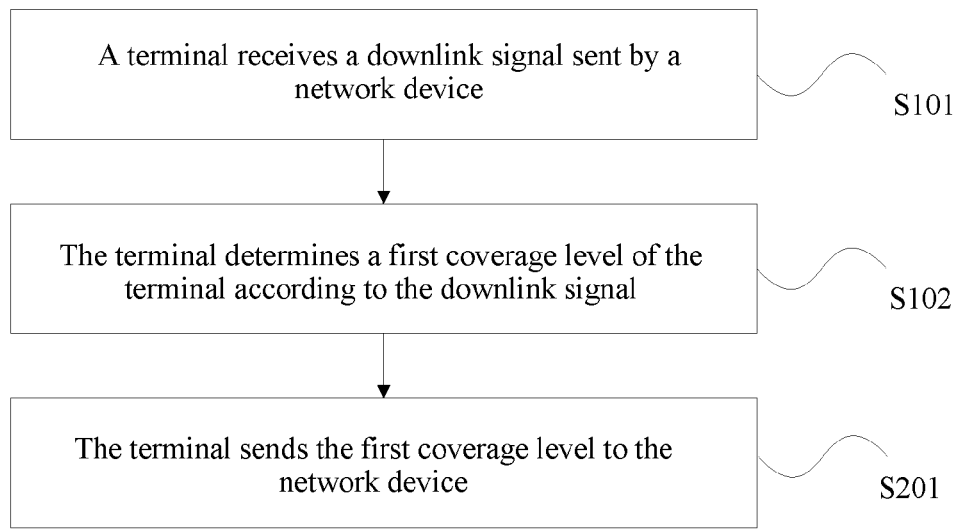
FIG. 10 is a schematic flowchart of a second embodiment of a wireless network coverage enhancement method according to the present invention.

FIG. 10 is a schematic flowchart of a second embodiment of a wireless network coverage enhancement method according to the present invention. This embodiment involves a process in which the network device performs resource scheduling on the terminal according to the first coverage level sent by the terminal. On the basis of the foregoing embodiment, further, after S102, the foregoing method further includes the following step:

S201: The terminal sends the first coverage level to the network device.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Figure 11:
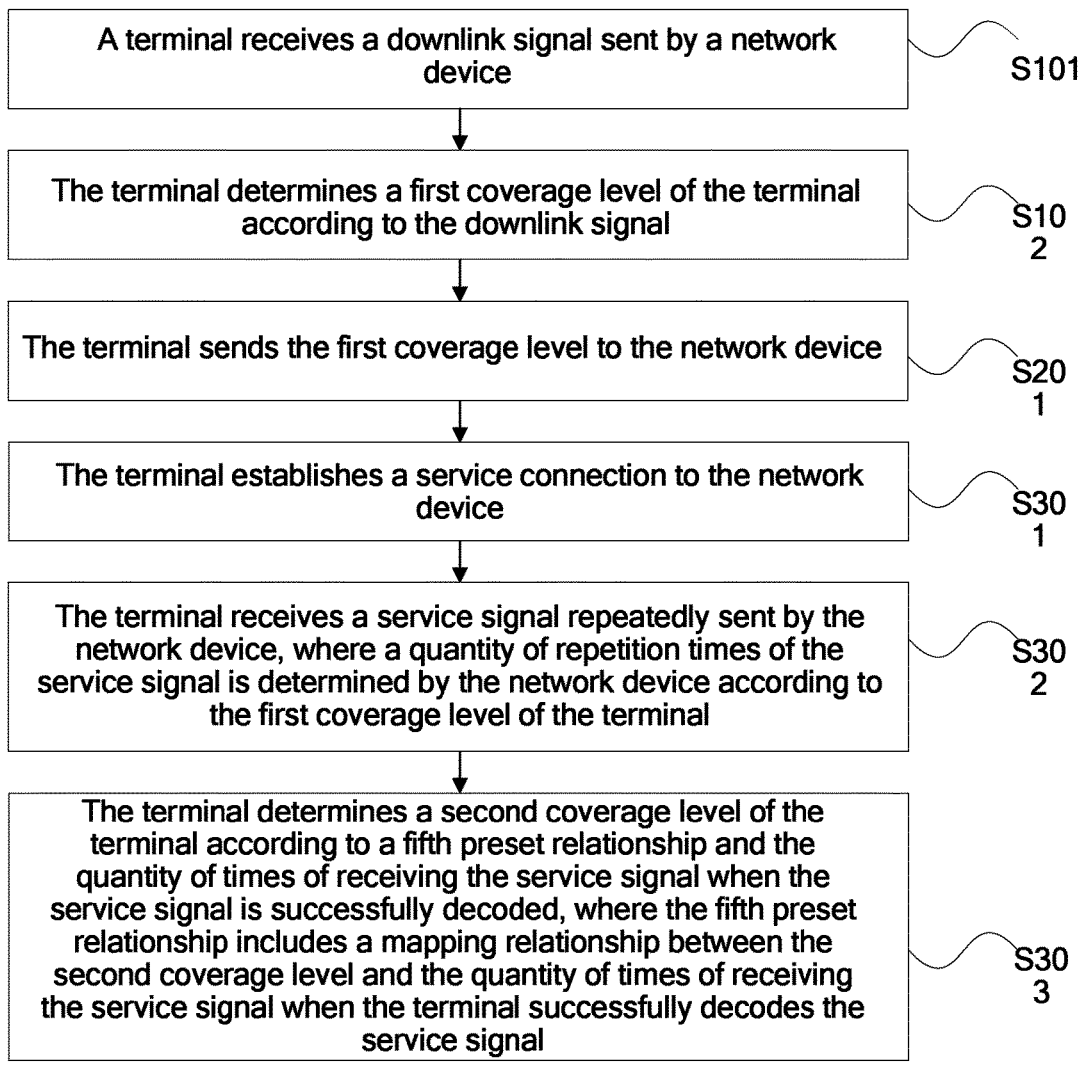
FIG. 11 is a schematic flowchart of a third embodiment of a wireless network coverage enhancement method according to the present invention.

FIG. 11 is a schematic flowchart of a third embodiment of a wireless network coverage enhancement method according to the present invention. This embodiment involves a specific process in which when performing service communication with the network device, the terminal updates the coverage level of the terminal according to a service signal delivered by the network device. As shown in FIG. 11, after S201, the method may further include the following steps:

S301: The terminal establishes a service connection to the network device.

S302: The terminal receives a service signal repeatedly sent by the network device, where a quantity of repetition times of the service signal is determined by the network device according to the first coverage level of the terminal.

S303: The terminal determines a second coverage level of the terminal according to a fifth preset relationship and the quantity of times of receiving the service signal when the service signal is successfully decoded, where the fifth preset relationship includes a mapping relationship between the second coverage level and the quantity of times of receiving the service signal when the terminal successfully decodes the service signal.

For the wireless network coverage enhancement method provided in this embodiment of the present invention, reference may be made to an execution process of the foregoing embodiments of the terminal. Implementation principles and technical effects of the method and the terminal are similar, and details are not described herein again.

Figure 12:
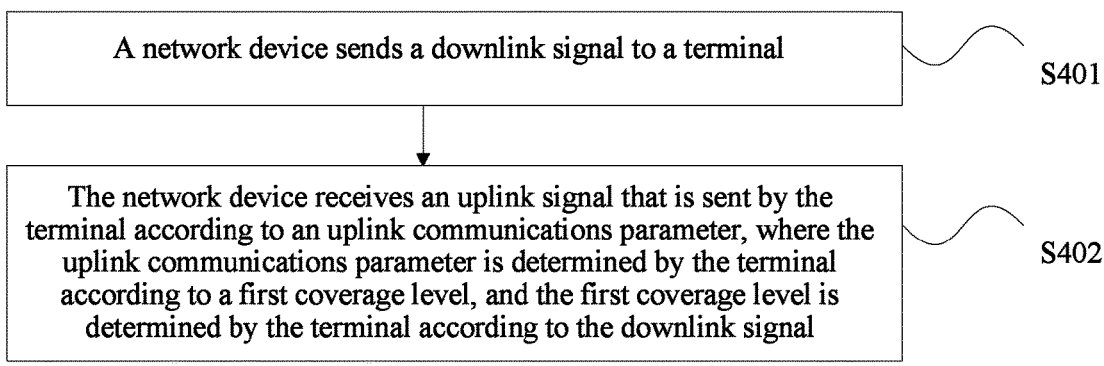
FIG. 12 is a schematic flowchart of a fourth embodiment of a wireless network coverage enhancement method according to the present invention.

FIG. 12 is a schematic flowchart of a fourth embodiment of a wireless network coverage enhancement method according to the present invention. As shown in FIG. 12, the method includes the following steps:

S401: A network device sends a downlink signal to a terminal.

S402: The network device receives an uplink signal that is sent by the terminal according to an uplink communications parameter, where the uplink communications parameter is determined by the terminal according to a first coverage level, and the first coverage level is determined by the terminal according to the downlink signal.

For the wireless network coverage enhancement method provided in this embodiment of the present invention, reference may be made to an execution process of the foregoing embodiments of the network device. Implementation principles and technical effects of the method and the network device are similar, and details are not described herein again.

Further, the uplink communications parameter includes at least one of the following: a quantity of repetition times, channel bandwidth, transmit power, or a modulation and coding scheme that is used for sending the uplink signal.

The downlink signal includes at least one of: a first signal transmitted on a downlink synchronization channel SCH, a second signal transmitted on a common transport channel CCH, a third signal transmitted on a broadcast control channel BCCH, a repeatedly-sent sequence signal used for downlink synchronization, a reference signal used for cell channel measurement, or a signal transmitted on a BCCH carrier.

Figure 13:
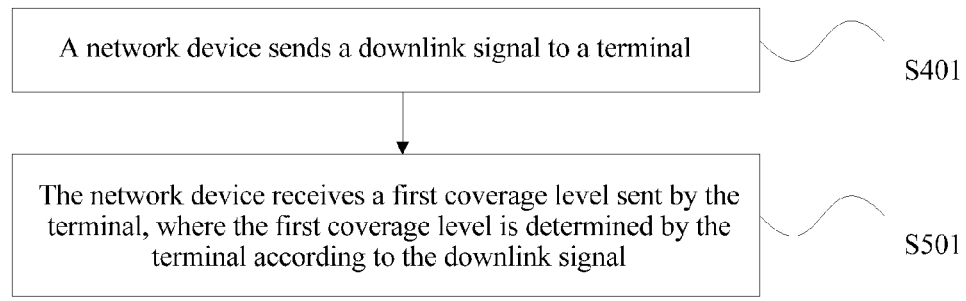
FIG. 13 is a schematic flowchart of a fifth embodiment of a wireless network coverage enhancement method according to the present invention.

FIG. 13 is a schematic flowchart of a fifth embodiment of a wireless network coverage enhancement method according to the present invention. This embodiment involves a process in which the network device performs resource scheduling on the terminal according to the first coverage level sent by the terminal. On the basis of the foregoing embodiment, further, as shown in FIG. 13, after S401, the foregoing method further includes the following step:

S501: The network device receives the first coverage level sent by the terminal, where the first coverage level is determined by the terminal according to the downlink signal.

For the wireless network coverage enhancement method provided in this embodiment of the present invention, reference may be made to an execution process of the foregoing embodiments of the network device. Implementation principles and technical effects of the method and the network device are similar, and details are not described herein again.

Figure 14:
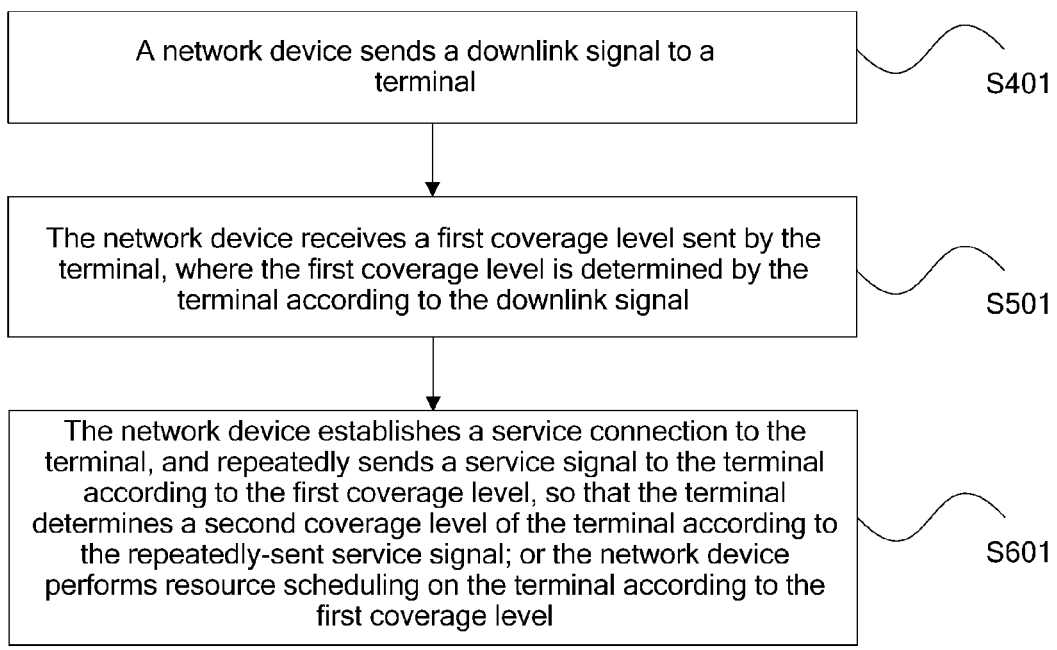
FIG. 14 is a schematic flowchart of a sixth embodiment of a wireless network coverage enhancement method according to the present invention.

FIG. 14 is a schematic flowchart of a sixth embodiment of a wireless network coverage enhancement method according to the present invention. This embodiment involves a specific process in which the network device establishes a service connection to the terminal, and repeatedly sends a service signal to the terminal, so that the terminal updates the coverage level of the terminal in a timely manner according to the sent service signal. On the basis of the foregoing embodiment of FIG. 13, further, as shown in FIG. 14, after S501, the foregoing method further includes the following step:

S601: The network device establishes a service connection to the terminal, and repeatedly sends a service signal to the terminal according to the first coverage level, so that the terminal determines a second coverage level of the terminal according to the repeatedly-sent service signal; or the network device performs resource scheduling on the terminal according to the first coverage level.

For the wireless network coverage enhancement method provided in this embodiment of the present invention, reference may be made to an execution process of the foregoing embodiments of the network device. Implementation principles and technical effects of the method and the network device are similar, and details are not described herein again.

Figure 15:
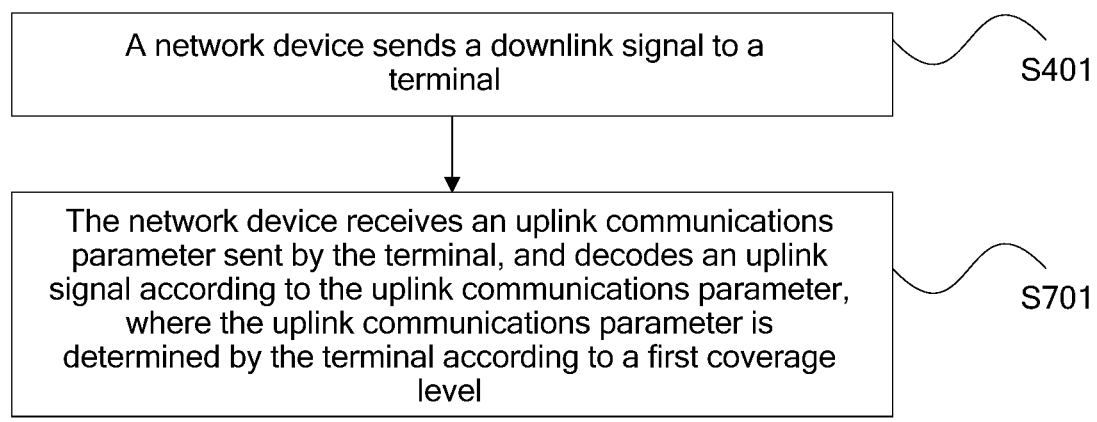
FIG. 15 is a schematic flowchart of a seventh embodiment of a wireless network coverage enhancement method according to the present invention.

FIG. 15 is a schematic flowchart of a seventh embodiment of a wireless network coverage enhancement method according to the present invention. This embodiment involves a process in which the network device decodes the uplink signal according to the uplink communications parameter sent by the terminal. After S401, as shown in FIG. 15, the foregoing method further includes the following step:

S701: The network device receives the uplink communications parameter sent by the terminal, and decodes the uplink signal according to the uplink communications parameter, where the uplink communications parameter is determined by the terminal according to a first coverage level.

For the wireless network coverage enhancement method provided in this embodiment of the present invention, reference may be made to an execution process of the foregoing embodiments of the network device. Implementation principles and technical effects of the method and the network device are similar, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal, comprising:
   a receiver, configured to receive a downlink signal sent by a network device;
   a processor, configured to determine a first coverage level of the terminal according to the downlink signal, and determine an uplink communications parameter according to the first coverage level; and
   a transmitter, configured to send an uplink signal to the network device according to the uplink communications parameter,
   wherein the first coverage level is an amount of coverage performance of the terminal,
   wherein the uplink communications parameter comprises a modulation and coding scheme that is used for sending the uplink signal by the terminal,
   wherein the downlink signal comprises at least one of: a first signal transmitted on a downlink synchronization channel (SCH), a second signal transmitted on a common transport channel (CCH), a third signal transmitted on a broadcast control channel (BCCH), a repeatedly-sent sequence signal used for downlink synchronization, a reference signal used for cell channel measurement, or a signal transmitted on a BCCH carrier, and
   wherein when the downlink signal includes multiple signals of the first signal, the second signal, the third signal, the repeatedly-sent sequence signal used for downlink synchronization, the reference signal used for cell channel measurement, and the signal transmitted on the BCCH carrier, the terminal is configured to determine one first coverage level according to each downlink signal, and to correspondingly analyze or calculate multiple first coverage levels to obtain a most accurate first coverage level of the terminal.

2. The terminal according to claim 1, wherein the uplink communications parameter further comprises channel bandwidth.

3. The terminal according to claim 1, wherein when the downlink signal is any one of the first signal, the second signal, or the third signal, the processor is further configured to: when the downlink signal is successfully decoded, determine the first coverage level of the terminal according to a first preset relationship and a quantity of times of receiving the downlink signal by the receiver, wherein the first preset relationship comprises a mapping relationship between the first coverage level and the quantity of times of receiving the downlink signal when the terminal successfully decodes the downlink signal.

4. The terminal according to claim 1, wherein when the downlink signal is the repeatedly-sent sequence signal used for downlink synchronization, the processor is configured to: perform, at a moment of receiving the downlink signal, energy accumulation on all downlink signals received by the receiver; correlate a signal obtained after energy accumulation and a preset reference signal of the downlink signal, to obtain a correlation value of the downlink signal; and when the correlation value of the downlink signal exceeds a preset threshold, determine the first coverage level of the terminal according to a second preset relationship and a quantity of times of receiving the downlink signal by the receiver, wherein the second preset relationship comprises a mapping relationship between the first coverage level and the quantity of times of receiving the downlink signal by the terminal when the correlation value of the downlink signal exceeds the preset threshold.

5. The terminal according to claim 1, wherein when the downlink signal is the signal transmitted on the BCCH carrier, the processor is configured to: measure received signal strength of the downlink signal received by the receiver in a preset period of time, determine first received signal strength according to the received signal strength that is of the downlink signal and is measured in the preset period of time, and determine the first coverage level of the terminal according to the first received signal strength and a third preset relationship, wherein the third preset relationship comprises a mapping relationship between the first received signal strength and the first coverage level.

6. The terminal according to claim 1, wherein when the downlink signal is the reference signal used for cell channel measurement, the processor is configured to: measure a path loss between the terminal and the network device according to the downlink signal received by the receiver in a preset period of time, determine a first path loss between the terminal and the network device according to all path losses measured in the preset period of time, and determine the first coverage level of the terminal according to the first path loss and a fourth preset relationship, wherein the fourth preset relationship comprises a mapping relationship between the first path loss and the first coverage level.

7. The terminal according to claim 1, wherein the transmitter is further configured to send the first coverage level to the network device.

8. The terminal according to claim 7, wherein the processor is further configured to establish a service connection to the network device;
   the receiver is further configured to receive a service signal repeatedly sent by the network device, wherein a quantity of repetition times of the service signal is determined by the network device according to the first coverage level of the terminal; and
   the processor is further configured to determine a second coverage level of the terminal according to a fifth preset relationship and the quantity of times of receiving the service signal when the service signal is successfully decoded, wherein the fifth preset relationship comprises a mapping relationship between the second coverage level and the quantity of times of receiving the service signal when the terminal successfully decodes the service signal.

9. A wireless network coverage enhancement method, comprising:
   receiving, by a terminal, a downlink signal sent by a network device;
   determining, by the terminal, a first coverage level of the terminal according to the downlink signal;
   determining, by the terminal, an uplink communications parameter according to the first coverage level; and sending, by the terminal, an uplink signal to the network device according to the uplink communications parameter, wherein the first coverage level is an amount of coverage performance of the terminal, wherein the uplink communications parameter comprises a modulation and coding scheme that is used for sending the uplink signal by the terminal, wherein the downlink signal comprises at least one of: a first signal transmitted on a downlink synchronization channel (SCH), a second signal transmitted on a common transport channel (CCH), a third signal transmitted on a broadcast control channel (BCCH), a repeatedly-sent sequence signal used for downlink synchronization, a reference signal used for cell channel measurement, or a signal transmitted on a BCCH carrier, and wherein when the downlink signal includes multiple signals of the first signal, the second signal, the third signal, the repeatedly-sent sequence signal used for downlink synchronization, the reference signal used for cell channel measurement, and the signal transmitted on the BCCH carrier, the method further includes determining one first coverage level according to each downlink signal, and correspondingly analyzing or calculating multiple first coverage levels to obtain a most accurate first coverage level of the terminal.

10. The method according to claim 9 wherein the uplink communications parameter further comprises channel bandwidth.

11. The method according to claim 9, wherein when the downlink signal is any one of the first signal, the second signal, or the third signal, the determining, by the terminal, a first coverage level of the terminal according to the downlink signal comprises:

when the downlink signal is successfully decoded, determining, by the terminal, the first coverage level of the terminal according to a first preset relationship and a quantity of times of receiving the downlink signal, wherein the first preset relationship comprises a mapping relationship between the first coverage level and the quantity of times of receiving the downlink signal when the terminal successfully decodes the downlink signal.

12. The method according to claim 9, wherein when the downlink signal is the repeatedly-sent sequence signal used for downlink synchronization, the determining, by the terminal, a first coverage level of the terminal according to the downlink signal comprises:

performing, by the terminal at a moment of receiving the downlink signal, energy accumulation on all the received downlink signals;

correlating, by the terminal, a signal obtained after energy accumulation and a preset reference signal of the downlink signal, to obtain a correlation value of the downlink signal; and when the correlation value of the downlink signal exceeds a preset threshold, determining, by the terminal, the first coverage level of the terminal according to a second preset relationship and a quantity of times of receiving the downlink signal, wherein the second preset relationship comprises a mapping relationship between the first coverage level and the quantity of times of receiving the downlink signal by the terminal when the correlation value of the downlink signal exceeds the preset threshold.

13. The method according to claim 9, wherein when the downlink signal is the signal transmitted on the BCCH carrier, the determining, by the terminal, a first coverage level of the terminal according to the downlink signal comprises:

measuring, by the terminal, received signal strength of the downlink signal received in a preset period of time;

determining, by the terminal, first received signal strength according to the received signal strength that is of the downlink signal and is measured in the preset period of time; and determining, by the terminal, the first coverage level of the terminal according to the first received signal strength and a third preset relationship, wherein the third preset relationship comprises a mapping relationship between the first received signal strength and the first coverage level.

14. The method according to claim 9, wherein when the downlink signal is the reference signal used for cell channel measurement, the determining, by the terminal, a first coverage level of the terminal according to the downlink signal comprises:

measuring, by the terminal, a path loss between the terminal and the network device according to the downlink signal received in a preset period of time;

determining, by the terminal, a first path loss between the terminal and the network device according to all path losses measured in the preset period of time; and determining, by the terminal, the first coverage level of the terminal according to the first path loss and a fourth preset relationship, wherein the fourth preset relationship comprises a mapping relationship between the first path loss and the first coverage level.

15. The method according to claim 9, wherein the method further comprises:

sending, by the terminal, the first coverage level to the network device.

16. The method according to claim 15, wherein after the sending, by the terminal, the first coverage level to the network device, the method further comprises:

establishing, by the terminal, a service connection to the network device;

receiving, by the terminal, a service signal repeatedly sent by the network device, wherein a quantity of repetition times of the service signal is determined by the network device according to the first coverage level of the terminal; and determining, by the terminal, a second coverage level of the terminal according to a fifth preset relationship and the quantity of times of receiving the service signal when the service signal is successfully decoded, wherein the fifth preset relationship comprises a mapping relationship between the second coverage level and the quantity of times of receiving the service signal when the terminal successfully decodes the service signal.

* * * * *